United States Patent
D'Andrea et al.

(10) Patent No.: US 10,143,930 B2
(45) Date of Patent: Dec. 4, 2018

(54) FLEXIBLY SUPPORTED MOVABLE PLATFORM HAVING AN ACTUATOR TO MOVE A DISPLAY

(71) Applicant: Verity Studios AG, Zurich (CH)

(72) Inventors: Raffaello D'Andrea, Wollerau (CH); Luca Gherardi, Zurich (CH); Markus Hehn, Zurich (CH); Markus Waibel, Zurich (CH)

(73) Assignee: Verity Studios AG, Zurich (CH)

(*) Notice: Subject to any disclaimer, the term of this patent is extended or adjusted under 35 U.S.C. 154(b) by 306 days.

(21) Appl. No.: 14/757,950

(22) Filed: Dec. 24, 2015

(65) Prior Publication Data
US 2016/0184719 A1 Jun. 30, 2016

Related U.S. Application Data

(60) Provisional application No. 62/096,554, filed on Dec. 24, 2014.

(51) Int. Cl.
*G05B 15/02* (2006.01)
*A63G 31/02* (2006.01)
(Continued)

(52) U.S. Cl.
CPC ........... *A63G 31/02* (2013.01); *F16M 11/045* (2013.01); *F16M 11/046* (2013.01);
(Continued)

(58) Field of Classification Search
CPC ...... A63G 31/02; G05B 15/02; F16M 11/045; F16M 11/048; F16M 11/046; F16M 13/027; B66C 13/08; G03B 17/00
(Continued)

(56) References Cited

U.S. PATENT DOCUMENTS 6,354,946 B1 3/2002 Finn
6,466,168 B1 10/2002 McEwan
(Continued)

FOREIGN PATENT DOCUMENTS

EP 1219047 B1 5/2010
EP 1334372 B1 3/2013
(Continued)

OTHER PUBLICATIONS

International Search Report and Written Opinion of the International Searching Authority for application No. PCT/IB2015/059919, dated Apr. 11, 2016.

*Primary Examiner* — David Lam
(74) *Attorney, Agent, or Firm* — Haley Guiliano LLP

(57) ABSTRACT

A movable platform, comprising a structural element, a display structured and arranged to be coupled to the structural element, a first flexible support with a first end structured and arranged to be coupled to the structural element and a second end structured and arranged to be coupled to a support structure. The platform further comprises a sensor structured and arranged to provide data representative of movement of the display and at least one actuator, wherein the at least one actuator is structured and arranged to move the display based on at least one control signal. The platform further comprises a control module structured and arranged to send the at least one control signal to the at least one actuator, and operable to determine the at least one control signal based on the data representative of movement of the display and a reference signal.

24 Claims, 28 Drawing Sheets

(51) Int. Cl.
*F16M 11/04* (2006.01)
*F16M 13/02* (2006.01)

(52) U.S. Cl.
CPC ........ *F16M 11/048* (2013.01); *F16M 13/027* (2013.01); *G05B 15/02* (2013.01)

(58) Field of Classification Search
USPC .......................... 700/275; 396/428; 212/318
See application file for complete search history.

(56) References Cited

U.S. PATENT DOCUMENTS

| | | | |
|---|---|---|---|
| 6,585,597 B2 | 7/2003 | Finn | |
| 6,661,342 B2 | 12/2003 | Hall et al. | |
| 6,763,282 B2 | 7/2004 | Glenn et al. | |
| 6,768,944 B2 | 7/2004 | Breed et al. | |
| 6,868,314 B1 | 3/2005 | Frink | |
| 6,879,878 B2 | 4/2005 | Glenn et al. | |
| 6,895,301 B2 | 5/2005 | Mountz | |
| 7,023,833 B1 | 4/2006 | Aiello et al. | |
| 7,031,294 B2 | 4/2006 | Aiello et al. | |
| 7,038,589 B2 | 5/2006 | Schmidt et al. | |
| 7,069,111 B2 | 6/2006 | Glenn et al. | |
| 7,292,269 B2 | 11/2007 | Raskar et al. | |
| 7,403,783 B2 | 7/2008 | Cheok et al. | |
| 7,555,370 B2 | 6/2009 | Breed et al. | |
| 7,574,219 B2 | 8/2009 | Rofheart et al. | |
| 7,592,944 B2 | 9/2009 | Fullerton et al. | |
| 7,610,146 B2 | 10/2009 | Breed | |
| 7,636,062 B2 | 12/2009 | Ward et al. | |
| 7,768,394 B2 | 8/2010 | Amidi | |
| 7,783,385 B2 | 8/2010 | Tamura | |
| 7,839,916 B1 | 11/2010 | Luecke et al. | |
| 7,962,285 B2 | 6/2011 | Breed | |
| 7,974,264 B2 | 7/2011 | Rothschild | |
| 7,979,172 B2 | 7/2011 | Breed | |
| 7,983,694 B2 | 7/2011 | Cheok et al. | |
| 8,010,133 B2 | 8/2011 | Cheok et al. | |
| 8,031,690 B2 | 10/2011 | Aiello et al. | |
| 8,040,859 B2 | 10/2011 | Chowdhury et al. | |
| 8,160,609 B2 | 4/2012 | Alles et al. | |
| 8,169,319 B2 | 5/2012 | Kaplan et al. | |
| 8,203,487 B2 | 6/2012 | Hol et al. | |
| 8,214,147 B2 | 7/2012 | Cheok et al. | |
| 8,248,263 B2 | 8/2012 | Shervey et al. | |
| 8,251,597 B2 * | 8/2012 | Dougherty | G03B 17/00 396/12 |
| 8,284,100 B2 | 10/2012 | Vartanian et al. | |
| 8,319,687 B2 | 11/2012 | Kahle | |
| 8,723,872 B2 | 5/2014 | Beardsley et al. | |
| 9,143,769 B2 | 9/2015 | Ratti | |
| 2007/0064208 A1 * | 3/2007 | Giegerich | F16M 11/18 353/122 |
| 2008/0054836 A1 | 3/2008 | Rodnunsky et al. | |
| 2008/0234930 A1 | 9/2008 | Cheok et al. | |
| 2009/0081923 A1 | 3/2009 | Dooley et al. | |
| 2012/0165012 A1 | 6/2012 | Fischer et al. | |
| 2012/0290168 A1 | 11/2012 | De et al. | |
| 2013/0050652 A1 | 2/2013 | Wharton | |
| 2013/0126457 A1 * | 5/2013 | Sturm, Jr. | B66C 11/08 212/318 |
| 2015/0212391 A1 | 7/2015 | Waibel et al. | |

FOREIGN PATENT DOCUMENTS

| | | |
|---|---|---|
| WO | WO-2001/95278 A1 | 12/2001 |
| WO | WO-2005/081012 A1 | 9/2005 |
| WO | WO-2007/030665 A2 | 3/2007 |
| WO | WO-2008/116168 A1 | 9/2008 |
| WO | WO-2012/034832 A1 | 3/2012 |
| WO | WO-2013/155639 A1 | 10/2013 |

\* cited by examiner

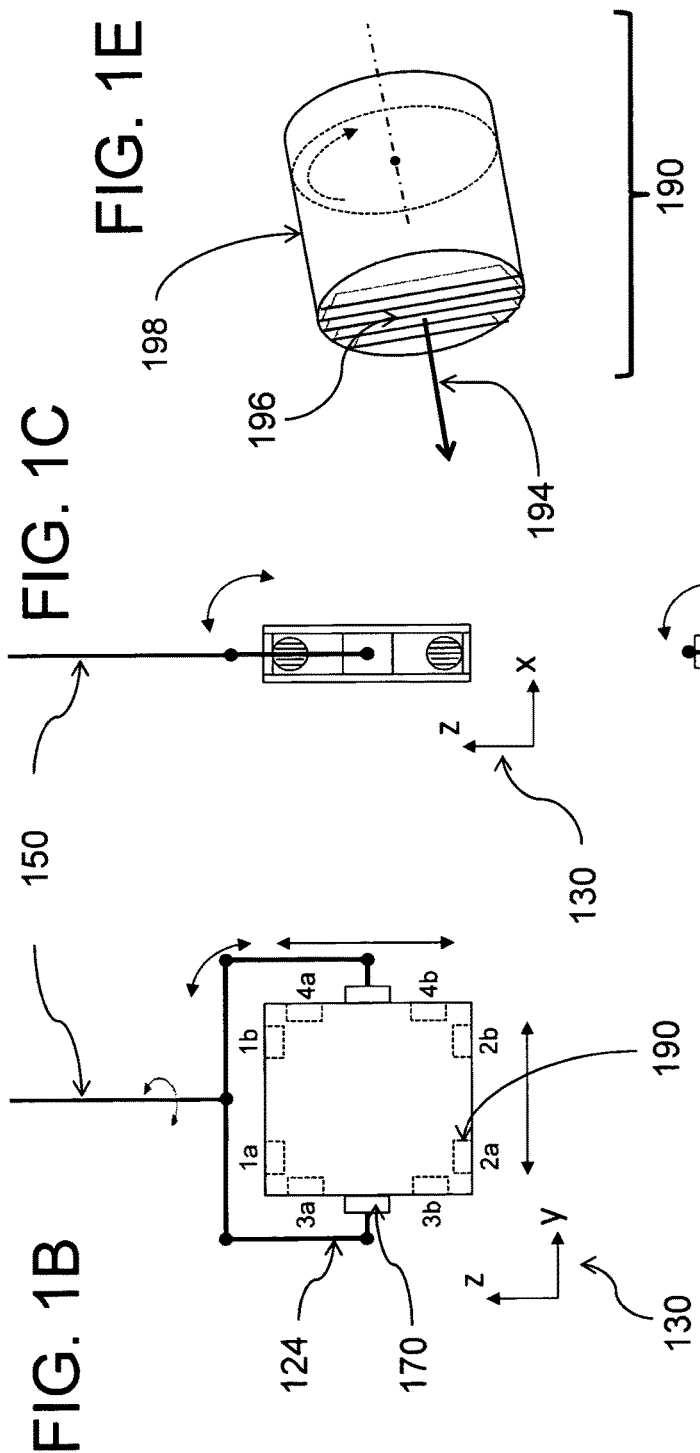

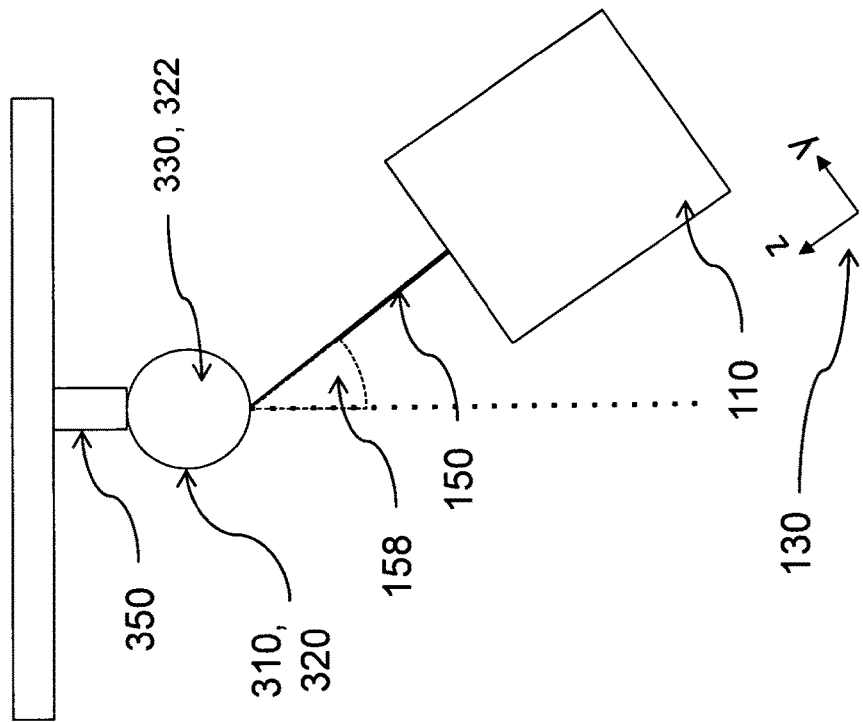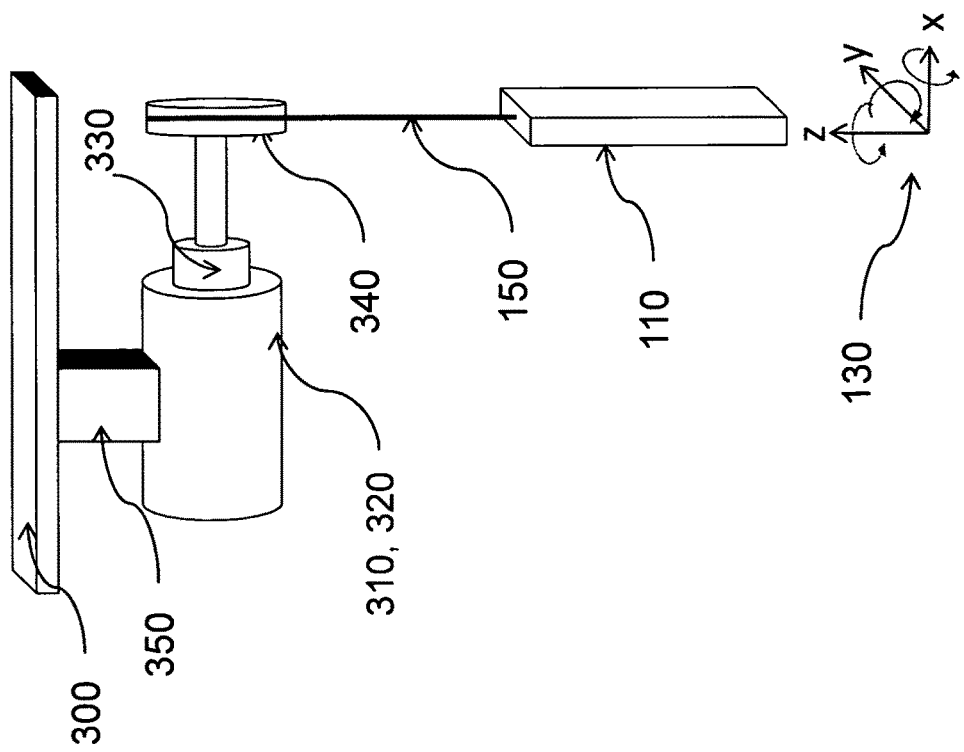

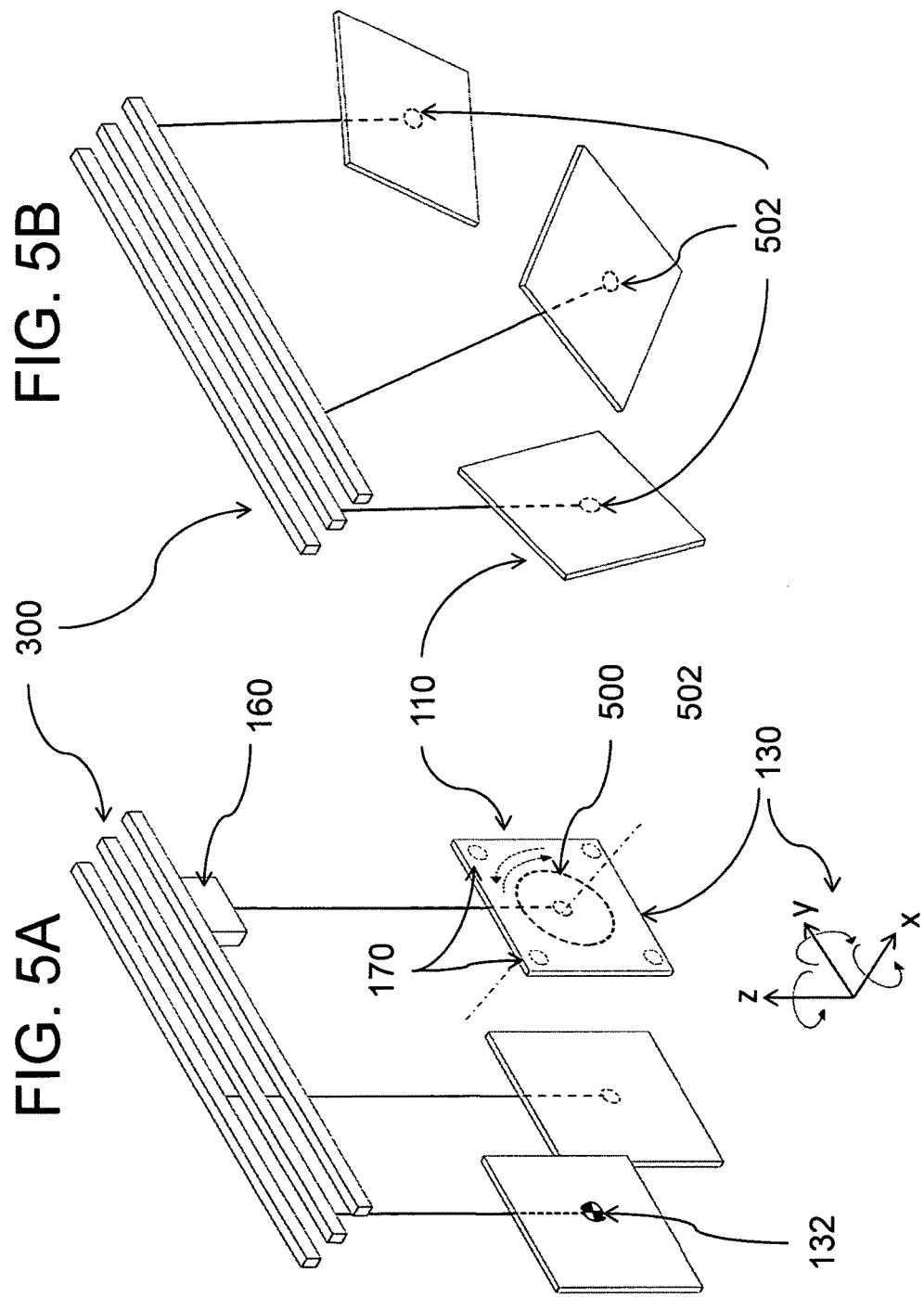

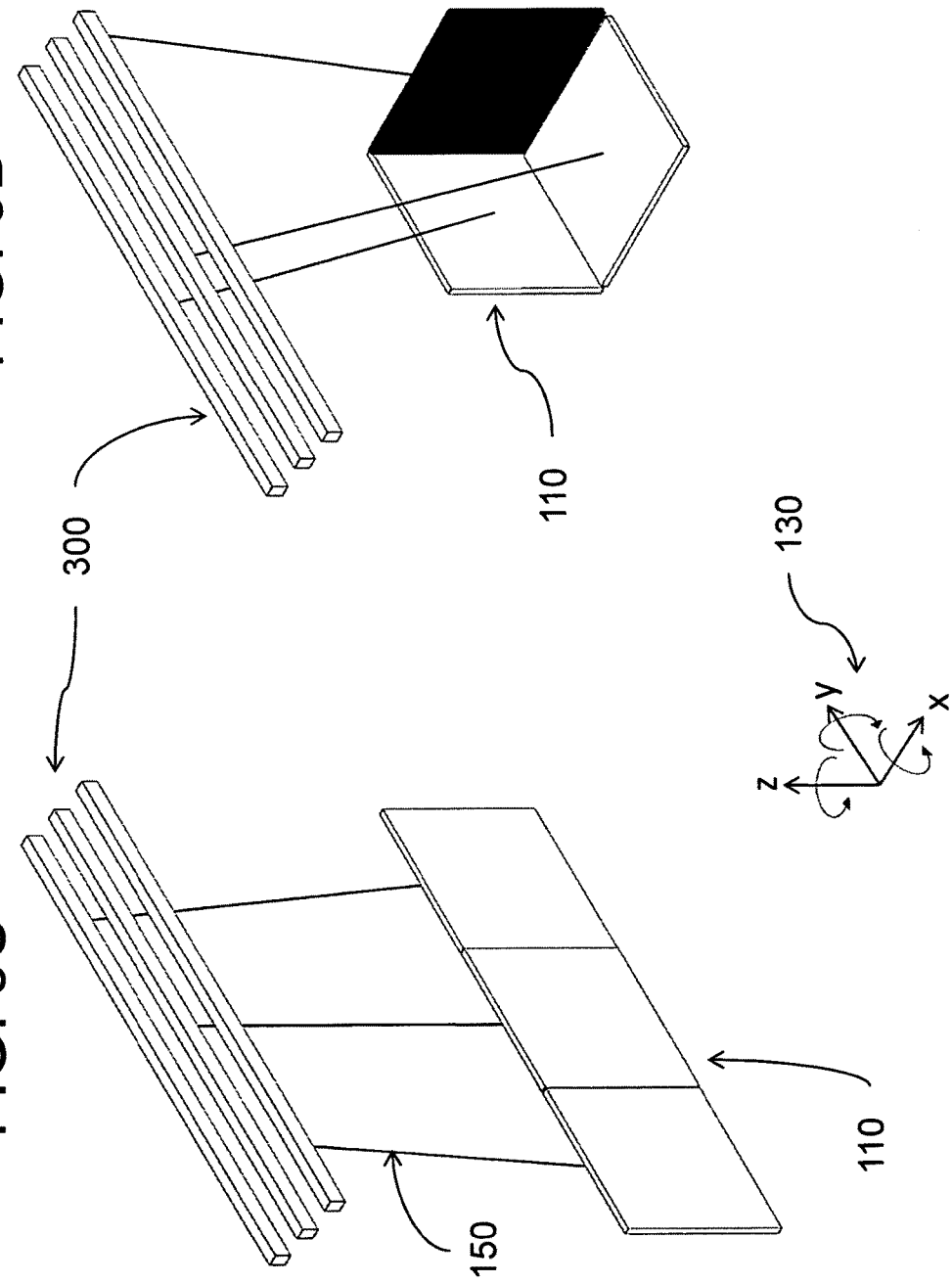

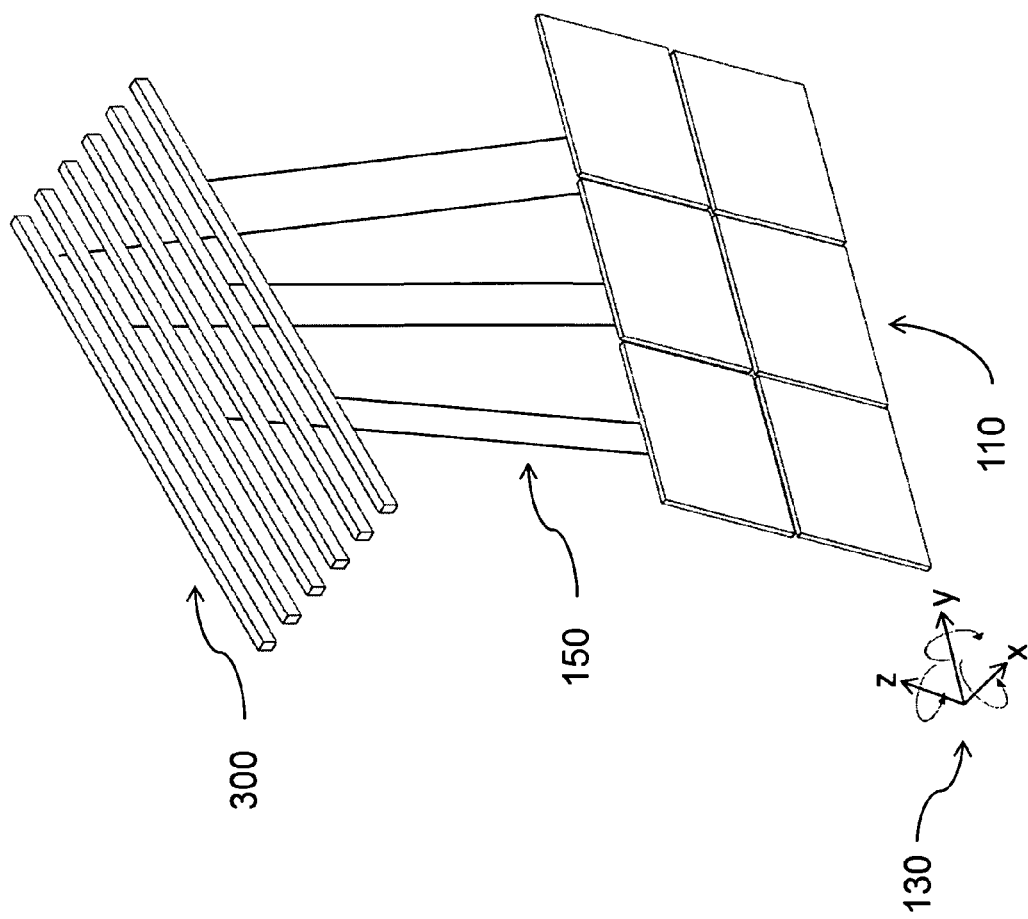

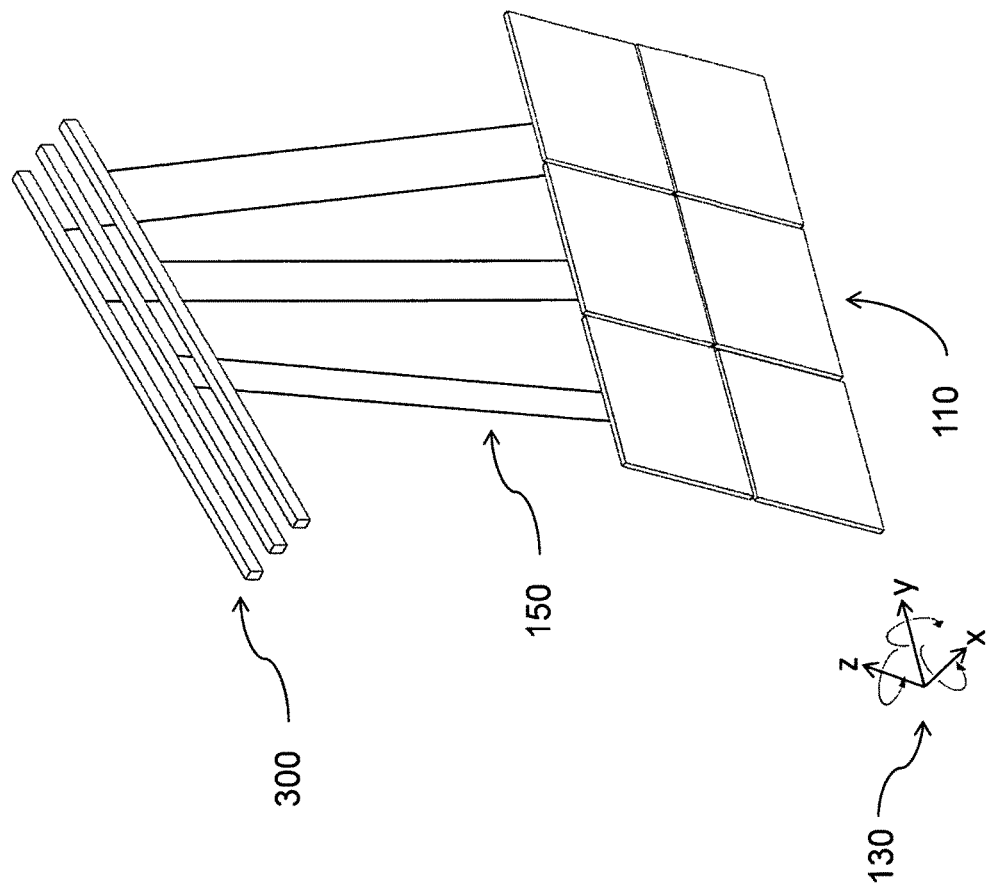

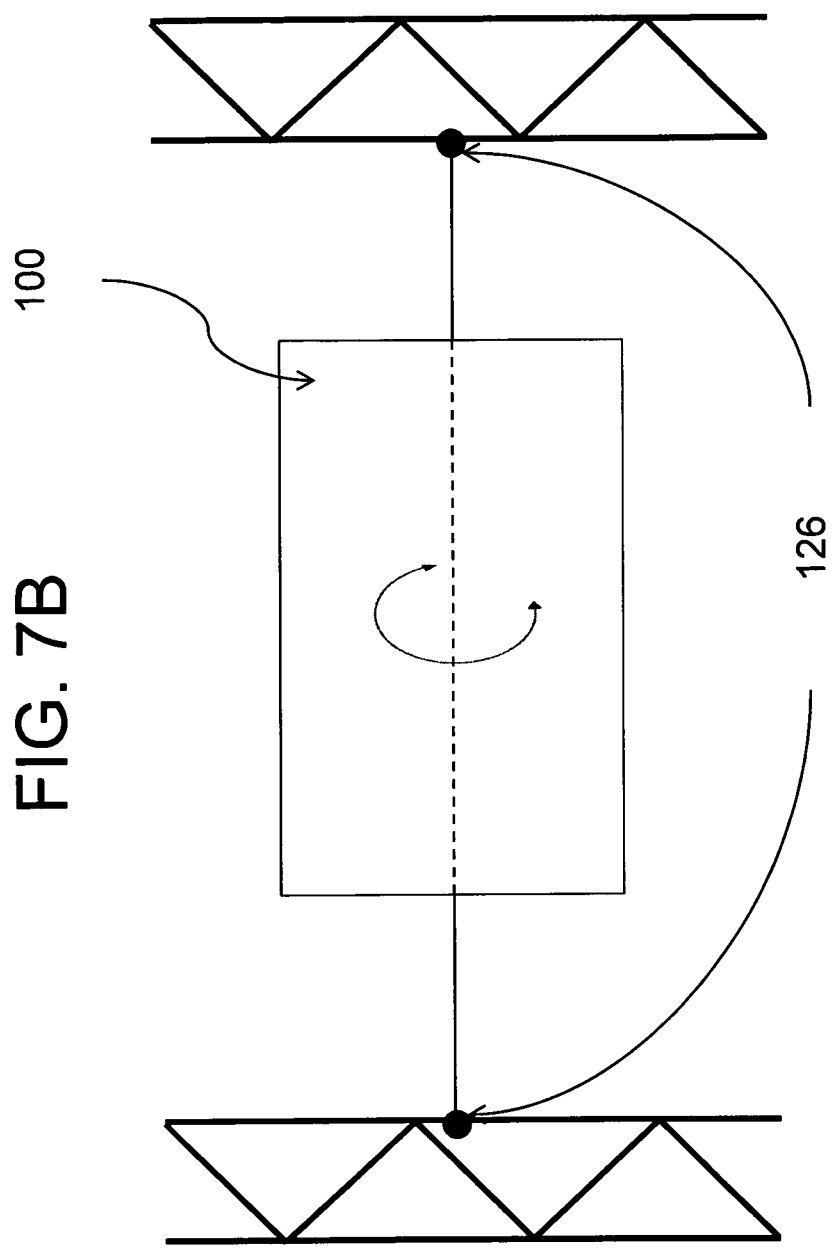

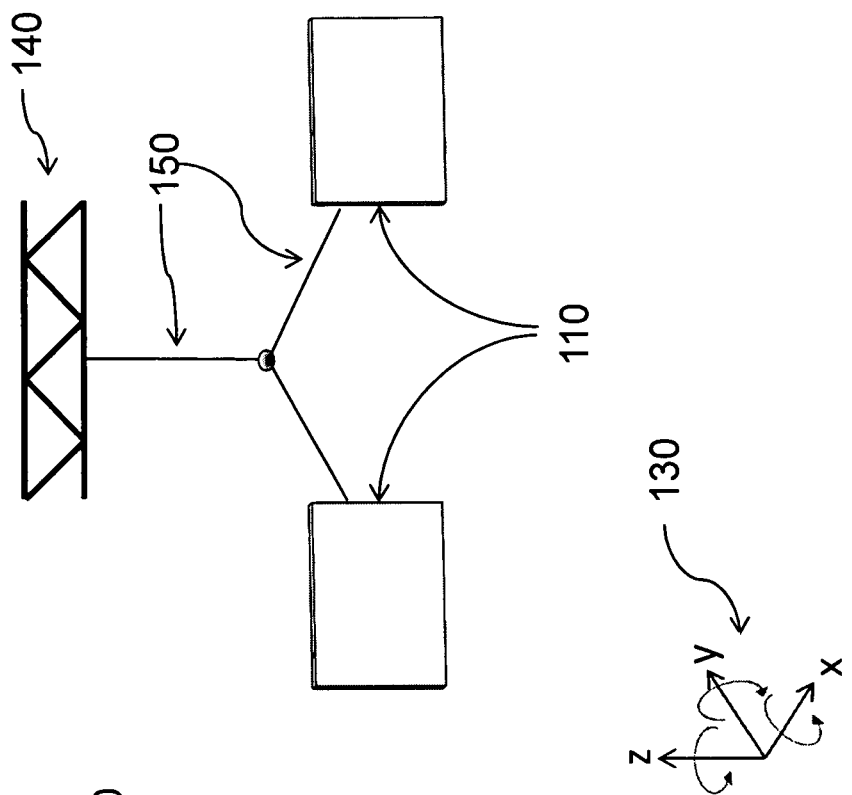
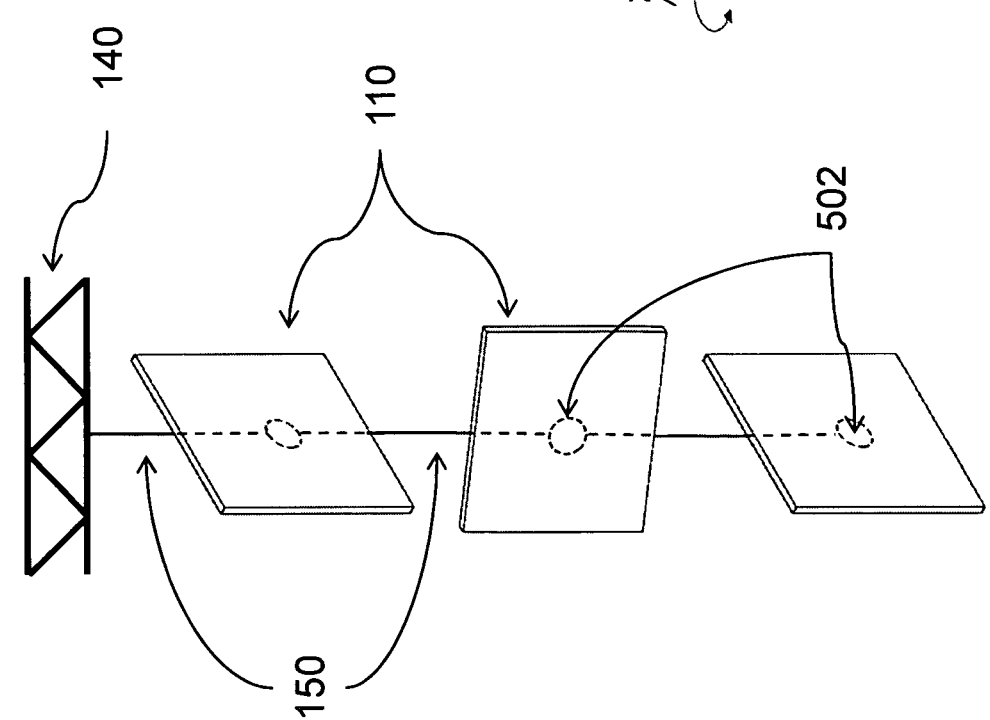
FIG. 7D

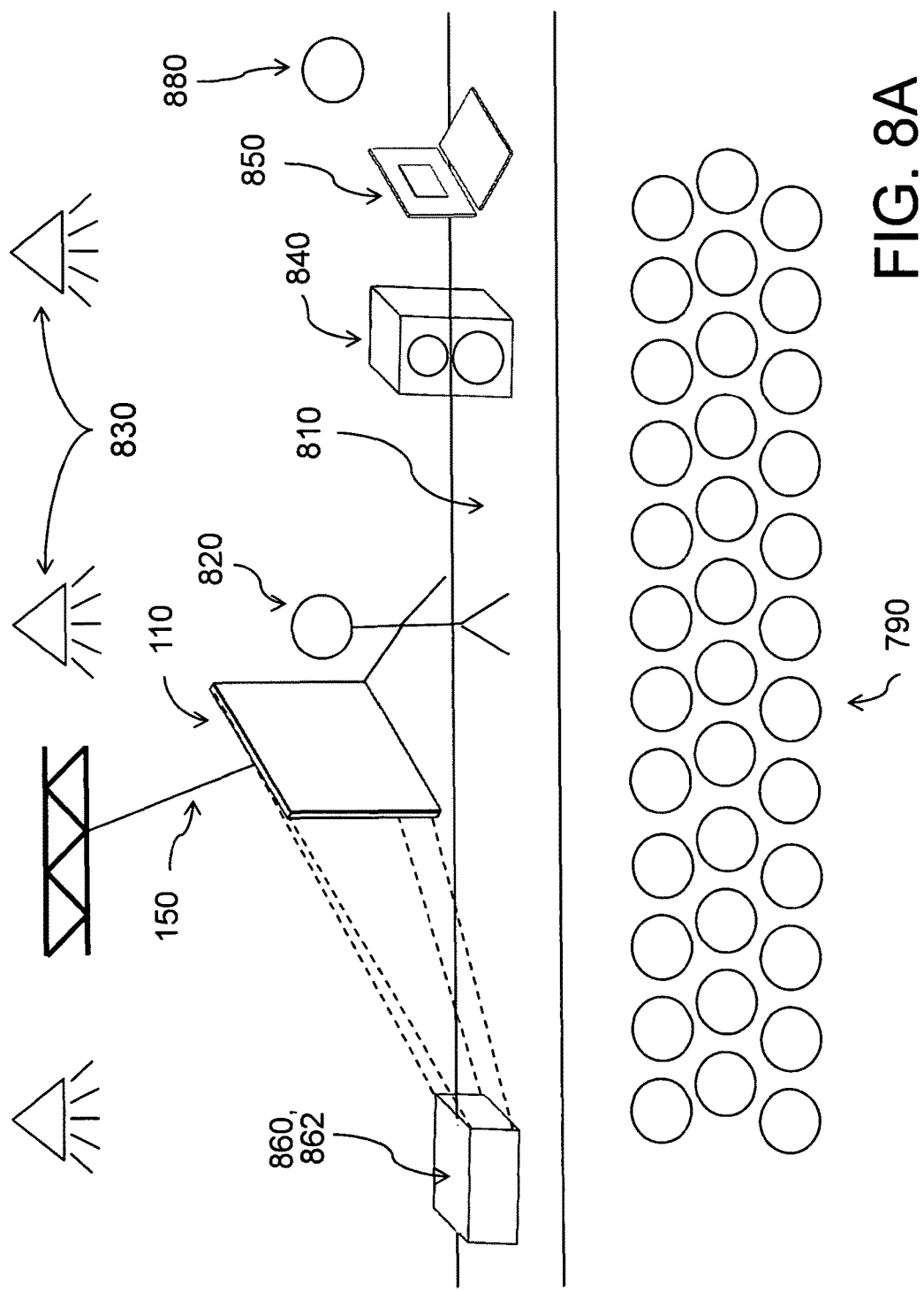

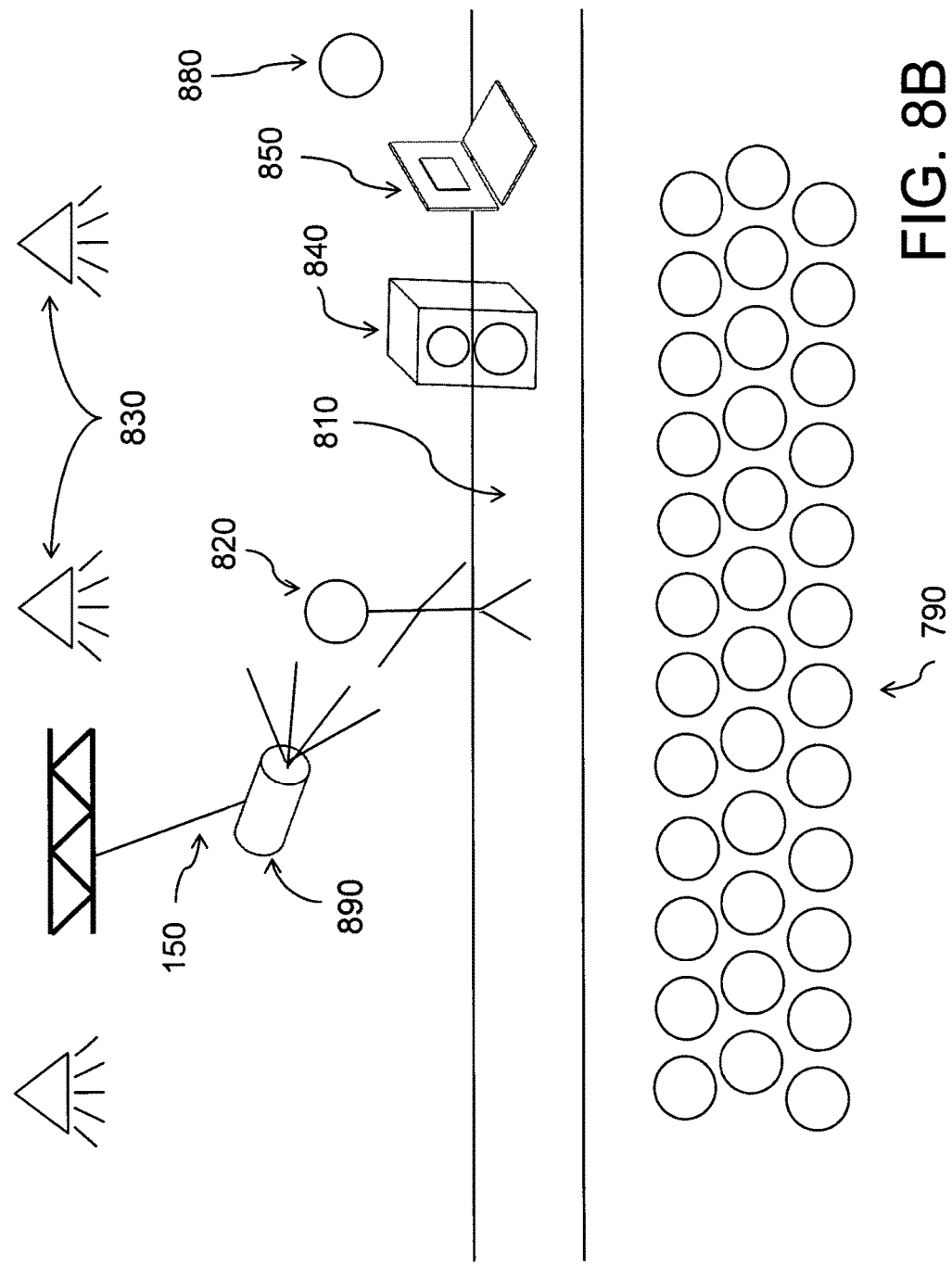

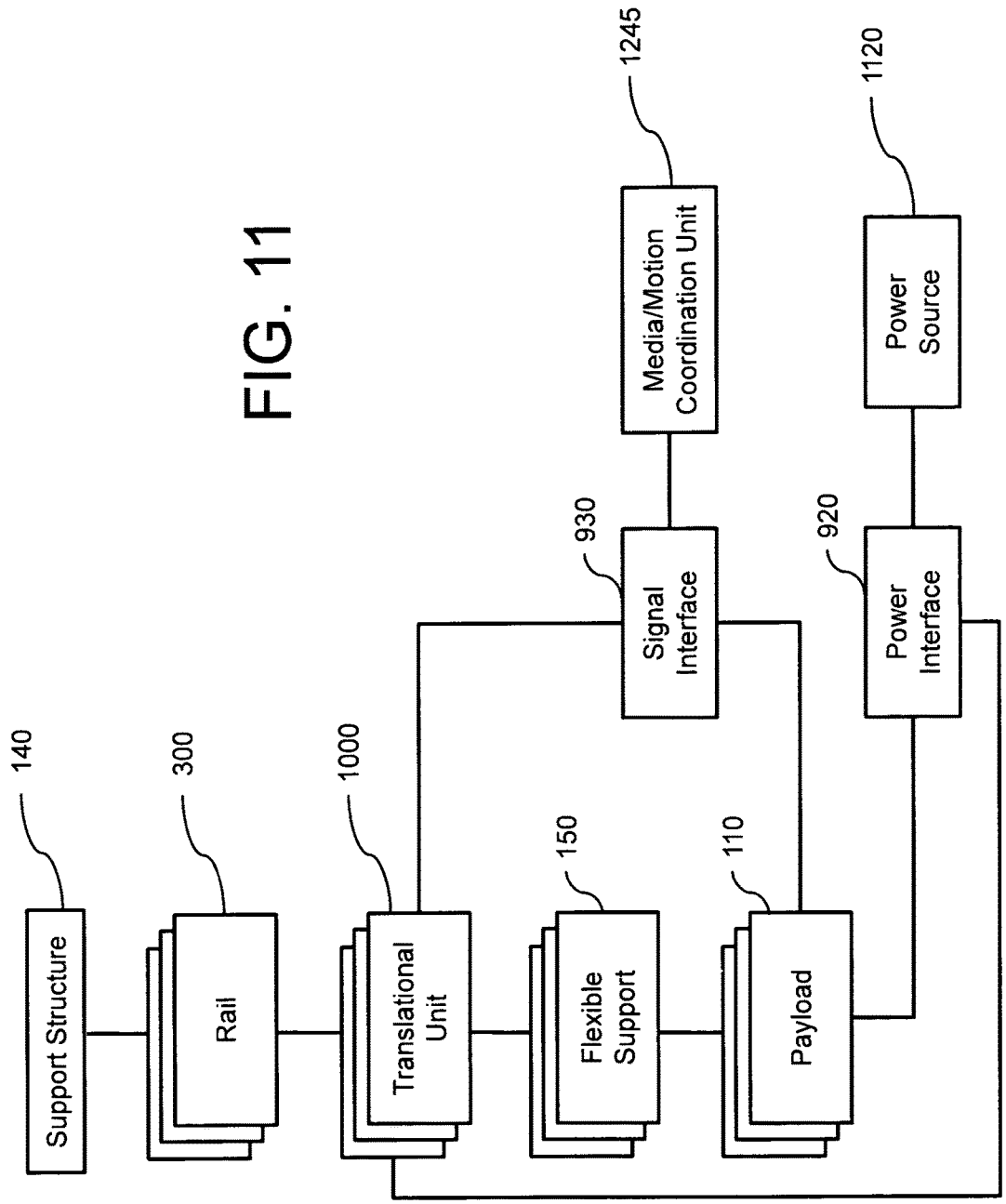

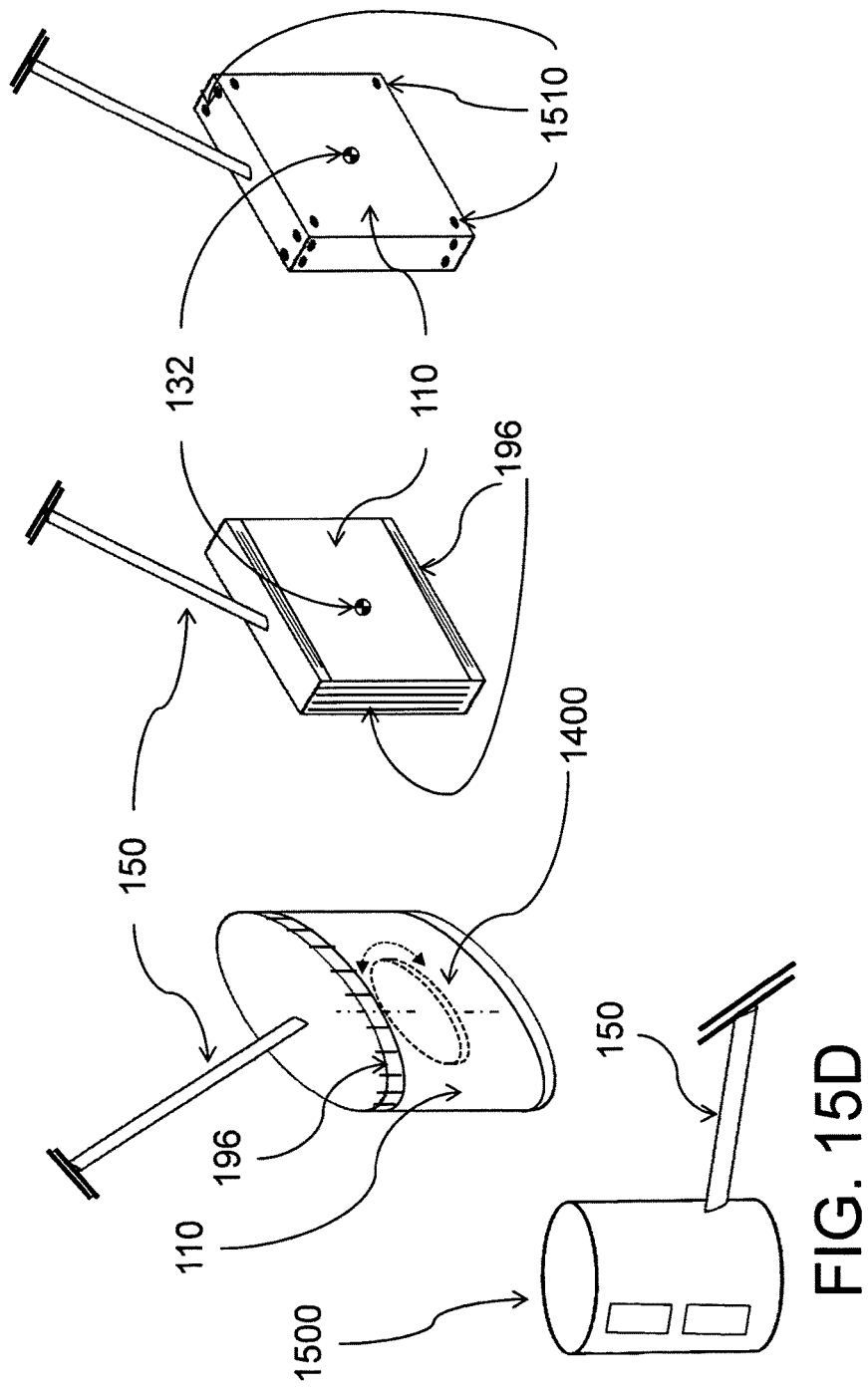

FLEXIBLY SUPPORTED MOVABLE PLATFORM HAVING AN ACTUATOR TO MOVE A DISPLAY

CROSS-REFERENCE TO RELATED APPLICATION

The present disclosure claims priority to U.S. Provisional Application No. 62/096,554, filed Dec. 24, 2014, which is hereby incorporated by reference herein in its entirety.

FIELD OF THE DISCLOSURE

The present disclosure relates to suspended, movable platforms. More specifically, it relates to the controlled operation and movement of flexibly supported movable platforms using onboard or offboard actuators and sensors.

BACKGROUND

Hoists are frequently used to lift or lower loads with ropes or chains. For example, they are used to move large displays such as LCD displays and video projection screens that are frequently used to display video or lighting effects as part of productions for the entertainment industry, including their use in concerts, sports events, shows, and video productions, as well as in other industries such as advertising. Various technologies now allow displaying bright lights or images, at a fast rate or on a large scale, including plasma displays, LCD displays, LED displays, and displays using front/rear projection as well as spotlights, laser effects, and many other forms of stage lighting. While today's display screens are frequently used to display motion, the display screens themselves are typically fixed in place. Users of such display screens may therefore look for novel ways to make them more attractive to viewers, including moving the displays themselves. Similar limitations to a load's movement also exist across many other industries.

SUMMARY

In accordance with the present disclosure, limitations of current systems for movable platforms have been substantially reduced or eliminated. In particular, the inventors have provided a flexibly supported movable platform with embodiments that allow moving a light source (e.g., a screen display, stage lighting), camera (e.g., video camera), or other payload on a complex 6D trajectory through space.

Technical advantages of certain embodiments of the present invention may allow to move the platform along trajectories in two dimensions (i.e., moving the platform to defined positions on a plane), in three dimensions (i.e., moving the platform to defined positions in a volume), and in more dimensions (e.g., moving the platform to defined positions in a volume while simultaneously rotating it to defined orientations).

Other technical advantages of certain embodiments of the present invention may allow easier setup (assembly, arrangement, disassembly, storage, transportation). They may also offer aesthetic benefits (e.g., rotation to various orientations, dynamic movement, dynamic motions). They may also provide greater flexibility for its use. For example, some embodiments may no longer require rigid attachment, weighting, anchoring, or bracing for movement or for stabilization. As another example, they may allow simultaneous use of multiple platforms. As another example, they may allow more flexibility with respect to the location of, or operational requirements for, their attachment points.

Other technical advantages of certain embodiments of the present disclosure may allow a platform's movement to be integrated or coordinated with other effects. Examples include coordinated motion with video streams, lights, sounds, motion of stage equipment, motion of performers, or integration with other stage technologies. For example, a platform for a screen display may be combined with external projection systems. As another example, a flexibly supported movable display's movement may be coordinated with its lighting or with an external time code signal (e.g., extracted from music).

Other technical advantages of certain embodiments may allow the precise tracking of the platform's position and orientation, thereby enabling e.g. operation of a screen display in conjunction with projection or projection mapping from a stationary point.

Other technical advantages of certain embodiments of the present disclosure may allow the subsequent or simultaneous movement of multiple platforms. This may allow assembling individual platforms into larger, combined platforms (e.g., to create a large display screen from multiple individual display screens). Moreover, this may allow for new opportunities for interaction of physical motion and screen displays' content (e.g., characters jumping from one display to another; variations of popular video and arcade games such as Doodle Jump, Sonic Jump, Donkey Kong, etc.).

Yet other technical advantages of certain embodiments of the present disclosure may allow the platform setup to be highly versatile by allowing platforms of various sizes and shapes to be used in parallel. Moreover, certain embodiments may allow to actuate curved platforms (e.g., to create a curved display screen). Some embodiments may allow assemblies that form volumetric bodies such as cylinders, cubes, spheres, etc.

Yet other technical advantages of certain embodiments of the present disclosure may allow easy transport, operation, or maintenance of movable platforms. For example, certain embodiments may be actuated internally, only requiring a power connection through their flexible support (e.g., a cable). As another example, certain embodiments may not require consumables (e.g., batteries) for their operation, or may only require simple, very low-maintenance components (e.g., brushless motors), or may use lightweight actuators (e.g., ducted fans, propellers). Some embodiments may only require non-rigid attachments such as a flexible support (e.g., a cable or other flexible attachment). Some embodiments may no longer require taut cables. Some embodiments may no longer require vertical cables. In some embodiments, the flexible support structure may not need to support the platform's full weight at all times.

Yet other technical advantages of certain embodiments of the present disclosure may allow operating the platform's actuators at very low noise levels, making them suitable for e.g., live entertainment productions.

Yet other technical advantages of certain embodiments of the present disclosure may allow the system to be operated and controlled in real-time or at high update rates, enabling a wide range of dynamic motion effects.

Yet other technical advantages of certain embodiments of the present disclosure may allow improving the reliability of movable platforms. In particular, platforms may be attached to the ceiling using the flexible support to keep them at a safe distance from people (e.g., above performers or members of the audience) and may be moved during the performance as needed. Yet other technical advantages of certain embodiments of the present disclosure may allow the flexible support to be hidden from view.

Yet other technical advantages of the present disclosure may allow a better estimation of the movable platform's position and orientation in space, or of controlling its movement in space.

Other technical advantages of the present disclosure will be readily apparent to one skilled in the art from the following figures, descriptions, and claims. Moreover, while specific advantages have been enumerated above, various embodiments may include all, some, or none of the enumerated advantages.

According to a first aspect of the present disclosure, there is provided a movable platform, comprising a structural element; a platform structured and arranged to be coupled to the structural element; a first flexible support having a first end and a second end; a sensor structured and arranged to provide data representative of movement of the platform; and at least one actuator structured and arranged to be coupled to at least one of the structural element and the platform.

In some embodiments, the first end of the flexible support is structured and arranged to be coupled to the structural element at a proximal attachment point, and the second end of the flexible support is structured and arranged to be coupled to a support structure at a distal attachment point.

In some embodiments, the structural element is structured and arranged to hang from, and receive at least some support from, the first flexible support. In some embodiments, the flexible support is a cable. In some embodiments, the flexible support is a chain, rope, wire, or kinematic chain.

In some embodiments, the at least one actuator is structured and arranged to move the platform based on at least one control signal.

In some embodiments, the movable platform comprises a control module operable to determine said at least one control signal based on the data representative of movement of the platform. In some embodiments, the control module is structured and arranged to receive the data representative of the movement of the platform. In some embodiments, the control module is structured and arranged to send the at least one control signal to the at least one actuator.

In some embodiments, the sensor is structured and arranged to be coupled to one of the structural element and the platform.

In some embodiments, the first flexible support is structured and arranged to impose a constraint on the structural element. In some embodiments, the control module is operable to compute the at least one control signal based on the constraint imposed by the first flexible support. In some embodiments, said controlling is performed accounting for a crossing of flexible supports. In some embodiments, the control module is operable to perform sensor fusion. In some embodiments, said sensor fusion is performed accounting for a constraint imposed by a flexible support.

In some embodiments, the control module is operable to determine the at least one control signal based on data representative of media content for the platform or media content received from the platform. In some embodiments, the control module is operable to determine the at least one control signal based on a state of the movable platform.

In some embodiments a control module is used to coordinate the movement of the platform with a trigger signal.

In some embodiments, an angle is formed at the distal attachment point between the first flexible support and a vertical axis passing through the distal attachment point and wherein the first actuator is operable to cause the platform to move such that the angle changes by at least 5, 15, or 25 degrees when moving the platform based on the at least one control signal.

In some embodiments, the movable platform comprises a second actuator. In some embodiments, the second actuator structured and arranged to be coupled to the support structure. In some embodiments, the second actuator is structured and arranged to be coupled to the platform. In some embodiments the second actuator is structured and arranged to extend and retract the first flexible support from the distal attachment point or from the proximal attachment point based on a second control signal. In some embodiments, the distance between the distal attachment point and the proximal attachment point changes when the first flexible support is extended or retracted. In some embodiments, the control module is structured and arranged to send the second control signal to the second actuator.

In some embodiments, the movable platform comprises a second actuator structured and arranged to be coupled to the support structure, wherein the second actuator is structured and arranged to move the location of the distal attachment point based on a second control signal. In some embodiments, the control module is structured and arranged to send the second control signal to the second actuator.

In some embodiments, the platform comprises at least two actuators. In some embodiments the at least two actuators include at least one onboard actuator and at least one offboard or onboard actuator. In some embodiments, said at least two actuators are structured and arranged to move the platform based on at least two control signals, wherein the control module is structured and arranged to send the at least two control signals to the at least two actuators. In some embodiments, the control module is operable to determine the at least two control signals based on the data representative of the movement of the platform.

In some embodiments, the platform is used as a display. In some embodiments, the display is one of a projection display screen, LCD display screen, LED display screen, and plasma display screen. In some embodiments, the display is one of a multitude of OLEDs, a multitude of LEDs, or a display panel. In some embodiments, the display relies on external lighting (e.g., projection screens, mirrors, rear-projection screens). In some embodiments, displays that are less visible or, ideally, not visible at all when not illuminated are used (e.g., grey display screens). In some embodiments, displays with a narrow viewing angle may be used to reduce the visibility of the display when not in use or to hide the display's movement from an audience. In some embodiments, the display is combined with, and its function integrated with, that of another payload (e.g., a camera). In some embodiments the display is a visual indicator that provides feedback for a functionality or operational mode of a payload (e.g., a red LED indicating whether a camera is recording). In some embodiments the display is a lighting display. Examples of lighting displays include a spotlight, LED or CFL or halogen lighting, a laser, a floodlight, and an intelligent light. Intelligent lights are sometimes called automated lighting, moving lights, moving head, or Martin light.

In some embodiments, the platform carries an onboard payload. In some embodiments the payload comprises a stage effect. Examples of stage effects include pyrotechnics, a flame machine, an air cannon, a streamer, confetti, a fog or haze or stage snow or bubble machine, a reflector, or a CO2 cryo jet. In some embodiments the platform carries a recording device. Examples of recording devises include a camera and a microphone.

In some embodiments the platform has a housing that acts as a costume. In some embodiments the platform has a housing that acts as a safety cage.

In some embodiments, the flexible support may also be hidden from view (e.g., by using adequate materials, such as a light-absorbing black matte finish, or by minimizing its thickness or by careful choice of its attachment points).

In some embodiments, the control module is operable to determine the at least one control signal to achieve a desired position and orientation of the platform.

In some embodiments, the control module is operable to control at least two translational degrees of freedom and at least two rotational degrees of freedom of the platform.

In some embodiments, the movable platform, further comprises a second flexible support, wherein the structural element is further structured and arranged to hang from and receive at least some support from the second flexible support.

In some embodiments, the control module is operable to coordinate movement of multiple platforms.

In some embodiments, the movable platform is equipped with an onboard actuator structured and arranged to move the movable platform. In some embodiments, the movable platform is equipped with an off board actuator structured and arranged to move the movable platform. In some embodiments, the movable platform is equipped with an onboard and an offboard actuator, each structured and arranged to move the movable platform.

In some embodiments, the movable platform's actuator is structured and arranged to move the movable platform in its three translational degrees of freedom. In some embodiments, the actuator is structured and arranged to move the movable platform in its three rotational degrees of freedom. In some embodiments, the actuator is structured and arranged to move a part of the movable platform, such as a screen display attached to the movable platform's body. In some embodiments, multiple actuators are used in conjunction. In some embodiments, the payload is moved by a gimbal.

In some embodiments, the movable platform's actuator is structured and arranged to move the movable platform's position by at least 30 cm. In some embodiments, the movable platform's actuator is structured and arranged to move the movable platform's position by at least 100 cm. In some embodiments, the movable platform's actuator is structured and arranged to move the movable platform's rotation by at least 30 degrees. In some embodiments, the movable platform's actuator is structured and arranged to move the movable platform's rotation by at least 90 degrees.

In some embodiments, the movable platform's actuator is structured and arranged to move the movable platform dynamically.

Dynamic movements are movements that can be described using Newton's second law of motion and where inertia has a substantial effect on the movement of the movable platform.

In some embodiments, the movable platform's actuator belongs to the group of actuators that generate or redirect airflow. In some embodiments, the movable platform's actuator belongs to the group of propellers, ducted fans, air nozzles, fins, and vanes. In some embodiments, the at least one actuator is at least one of a ducted fan, propeller, air nozzle, fin, vane, flywheel, momentum wheel, and a mass shift mechanism. In some embodiments, the movable platform's actuators belong to the group of actuators that actuate joints. In some embodiments, the movable platform's actuator belongs to the group of actuators that actuate cables. In some embodiments, the movable platform's actuator belongs to the group of rotary actuators. In some embodiments, the movable platform's actuator belongs to the group of linear actuators.

In some embodiments, said movement in position or rotation affects only part of the movable platform, such as a screen display attached to the movable platform's body. In some embodiments, the onboard part of the platform comprises a structural element, a payload, an actuator, a sensor, and a control module. In some embodiments, the onboard part of the platform comprises a gimbal.

In some embodiments, the movable platform's actuator is structured and arranged to be able to support 10%, 50%, or 100% of the movable platform's weight. In some embodiments, the movable platform's onboard actuators are structured and arranged to be collectively able to support 10%, 50%, or 100% of the movable platform's weight. In some embodiments, said supporting actuators belong to the group of actuators that generate or redirect airflow.

In some embodiments, the movable platform is equipped with an onboard sensor structured and arranged to sense the movement of the movable platform. In some embodiments, the movable platform is equipped with an off board sensor structured and arranged to sense the movement of the movable platform. In some embodiments, the movable platform is equipped with onboard and off board sensors structured and arranged to sense the movement of the movable platform.

In some embodiments, the sensor is structured and arranged to sense the movement of the movable platform in its three translational degrees of freedom. In some embodiments, the sensor is structured and arranged to sense the movement of the movable platform in its three rotational degrees of freedom. In some embodiments, the sensor is structured and arranged to sense the movement of a part of the movable platform, such as a screen display attached to the movable platform's body. In some embodiments, multiple sensors are used in conjunction.

In some embodiments, the sensor is structured and arranged to sense an absolute length or a change in length of a flexible support. In some embodiments, the sensor is structured and arranged to sense an absolute angle of attachment or a change in an angle of attachment of a flexible support. In some embodiments, the sensor is structured and arranged to sense a force on the flexible support. In some embodiments, said sensor is located at the proximal or at the distant attachment point.

In some embodiments, the movable platform's sensor is structured and arranged to sense dynamic movements of the movable platform.

In some embodiments, the movable platform's sensor comprises at least one of a camera, accelerometer, magnetometer, and gyroscope.

In some embodiments, the movable platform's sensor belongs to the group of accelerometers, gyroscopes, magnetometers, cameras, optical flow sensors, barometers, encoders, and infra-red sensors.

In some embodiments, the movable platform's sensor belongs to the group of accelerometers, gyroscopes, magnetometers, cameras, optical flow sensors, laser or sonar range finders, radar, barometers, thermometers, hygrometers, bumpers, chemical sensors, electromagnetic sensors, air flow sensors and relative airspeed sensors, ultra sound sensors, microphones, radio sensors, and other height, distance, and range sensors, and infra-red sensors, time-of-flight sensors, and encoders.

In some embodiments, the movable platform comprises a sensor structured and arranged to detect data representative of the operation of at least one of the actuators used for the movement of the movable platform.

In some embodiments, the movable platform comprises a body, at least one actuator operable to move the movable platform, and at least one sensor operable to provide data representative of said movement of said movable platform. In some embodiments, an estimate of the state of said movable platform with respect to a predefined reference frame is computed. In some embodiments, said at least one actuator is controlled based on said estimate of said movable platform with respect to said predefined reference frame. In some embodiments, one of a length of the flexible support, a tension of the flexible support, or a direction of a flexible support may be used to improve said state estimate. In some embodiments, said estimate is computed accounting for a crossing of flexible supports.

According to another aspect of the present disclosure, there is provided a method for operating a movable platform. In some embodiments, the movable platform comprises an onboard portion, an offboard portion, a flexible support, an actuator, and a sensor. In some embodiments, the flexible support is structured and arranged to couple the onboard portion to the offboard portion. In some embodiments, the onboard portion is structured and arranged to hang from the flexible support. In some embodiments, the onboard portion is structured and arranged to receive at least some support from the flexible support. In some embodiments, the actuator is operable to move the onboard portion. In some embodiments, the actuator is structured and arranged to provide a force on the onboard portion that is independent from the support received from the flexible support. In some embodiments, the sensor is operable to provide data representative of movement of the onboard portion.

In some embodiments, the method comprises a step of filtering the data representative of movement of the onboard portion of the movable platform. In some embodiments, the method comprises a step of controlling the at least one actuator based on the filtered data representative of movement of the movable platform.

In some embodiments, filtering data includes computing an estimate of a state. In some embodiments, an estimate of a state is computed for at least the onboard portion of the movable platform. In some embodiments, a state is computed or defined with respect to a predefined reference frame. In some embodiments, a state is a position with respect to a predefined reference frame. In some embodiments, a state is an attitude with respect to a predefined reference frame. In some embodiments, a state is a rotational yaw rate.

In some embodiments, the method comprises a step of computing an estimate of the state of at least the onboard portion of the movable platform with respect to a predefined reference frame. In some embodiments, the method comprises a step of controlling the actuator based on the estimate of the movable platform with respect to the predefined reference frame.

In some embodiments, data representative of movement includes sensor data representative of a position (e.g., signals received from an angle encoder/decoder). In some embodiments, data representative of movement includes sensor data representative of a change in position (e.g., an optic flow sensor).

In some embodiments, said state includes at least two of a position, an attitude, a velocity, and a rotational rate of the movable platform. In some embodiments said state includes an acceleration. In some embodiments, a target state for said movable platform is defined. Is some embodiments, said target state is used for controlling said at least one actuator based on said estimate of said movable platform with respect to said predefined reference frame.

In some embodiments, a method comprises one or more of the following steps: Defining a target velocity of the onboard portion of the movable platform; estimating the current velocity of the onboard portion of the movable platform; comparing the target velocity and the current velocity; computing signals based on the comparison of the target velocity and the current velocity; or using the computed signals for controlling the at least one actuator to move the onboard portion of the movable platform with respect to the predefined reference frame.

In some embodiments, a method comprises one or more of the following steps: Defining a target position of the onboard portion of the movable platform; estimating the current position of the onboard portion of the movable platform; comparing the target position and the current position; computing signals based on the comparison of the target position and the current position; and using the computed signals for controlling the at least one actuator to move the onboard portion of the movable platform with respect to the predefined reference frame.

In some embodiments, the movable platform comprises a display, a flexible support, an actuator, a sensor, and a control module.

In some embodiments, the flexible support is structured and arranged to be coupled to the display. In some embodiments, the display is structured and arranged to receive at least some support from the flexible support. In some embodiments, the actuator is structured and arranged to move the display in space. In some embodiments, the sensor is structured and arranged to provide data representative of the movement of the display in space. In some embodiments, the control module is structured and arranged to receive the data representative of the movement of the display in space. In some embodiments, the control module is structured and arranged to determine one or more control signals for an actuator based on the data representative of the movement of the display in space and a reference signal. In some embodiments, the control module is structured and arranged to provide one or more control signals to an actuator.

According to another aspect of the present disclosure, there is provided a control unit for a movable platform. In some embodiments, the movable platform comprises a display; a flexible support; at least one actuator structured and arranged to move the display in space; at least one sensor structured and arranged to provide data representative the movement of the display in space; and a control module structured and arranged to receive the data representative the movement of the display in space and to provide control signals for the actuator.

In some embodiments, the control module comprises a sensors unit for sensing at least one of the data representative the movement of the platform or payload in space and data representative of the operation of the at least one actuator; an evaluation unit operationally connected to said sensing unit, and structured and arranged to (a) evaluate a signal from the sensors unit, and to (b) compute an estimate of the state of the movable platform. In some embodiments, the control unit is configured to provide the control signals to control the at least one actuator based on the estimate of the state of the movable platform.

BRIEF DESCRIPTION OF THE FIGURES

Some embodiments of the present disclosure are described in detail below with reference to the following figures:

FIGS. 1A to 1E are used to describe an example embodiment using a first type of actuation.

FIGS. 3A and 3B show example embodiments for attaching a flexibly supported movable platform to a support structure using a winch.

FIGS. 5A to 5D show four configurations of an embodiment consisting of three movable platforms attached to three separate guiderails.

FIGS. 6A to 6D show sample embodiments with a display consisting of six individual movable platforms assembled into a larger platform for use as a screen display.

FIGS. 7A to 7D show example embodiments that show various ways of how flexible supports may be used to attach movable platforms to support structures or that are used to explain dynamic movements.

FIGS. 8A and 8B show sample embodiments used in a stage setting.

FIG. 11 shows a block diagram used to explain how one or more movable platforms and one or more translation units may be combined and controlled in a single embodiment.

FIGS. 15A to 15D show other sample embodiments using various types of actuation.

DETAILED DESCRIPTION OF THE FIGURES

Figure 1A:
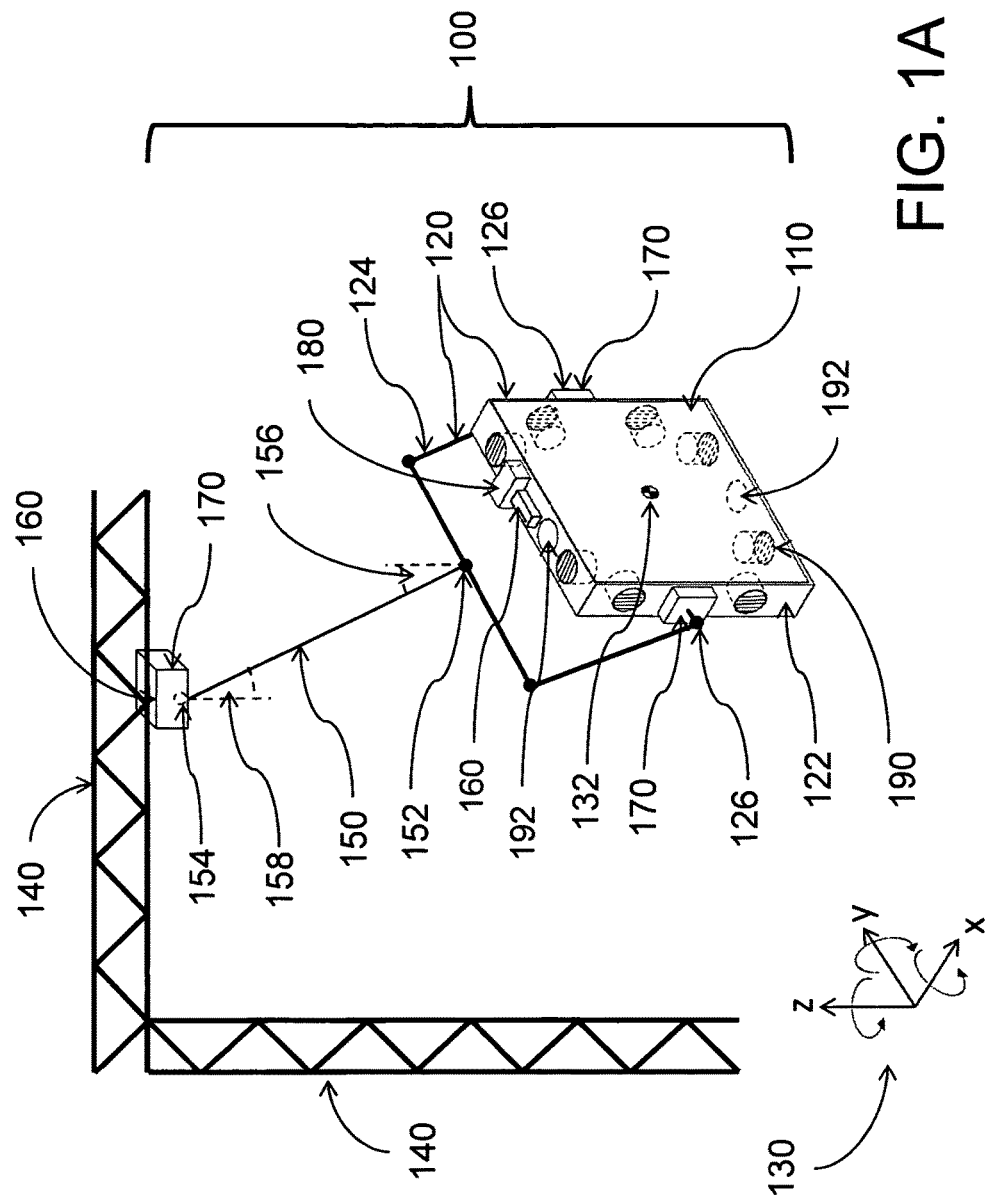

FIG. 1A shows a perspective view of a sample embodiment of a flexibly supported movable platform 100. A payload 110, such as a screen display, is attached to the front of the movable platform 100 using structural elements 120. In this embodiment, these structural elements include a housing 122 and a roll bar 124. The roll bar 124 is used as a simple gimbal. It has rotating joints 126 that allow part of the movable platform to rotate in pitch (i.e., rotation around the y-axis) in the movable platform's body coordinate frame 130.

The movable platform 100 is attached to a support structure 140 using a flexible support 150 (e.g., a cable). This is achieved by connecting the flexible support's proximal end 152 to a suitable attachment point on the structural element 120 (here on the roll bar 124) and the flexible support's distal end 154 to a suitable attachment point on the support structure 140. The flexible support may be elastic or inelastic and flexible in its lateral, rotational, or longitudinal direction (e.g., it may be able to withstand or resist stress such as bending; twisting; or pulling or compressing).

The movable platform's parts situated at the proximal end of the cable 150 are sometimes referred to as "onboard". Other parts and those situated at the distal end of the cable 150 in particular are sometimes referred to as "offboard".

The flexibly supported movable platform 100 of the present embodiment is equipped with onboard and offboard actuators 170 that allow it to be moved in space. These actuators 170 can move the platform 100 into a desired direction or orientation other than the direction of the cable. In the embodiment shown in FIG. 1A, these actuators 170 include eight ducted fans 190 mounted onboard, around the outside of the movable platform 100. Another actuator 170 allows to rotate the roll bar 124 around its rotating joints 126. Another actuator 170, here at the cable's second attachment point 154, may be used to change the length of the cable 150.

The movable platform 100 is also equipped with an onboard sensor 160. In addition, sensors off board 160 the movable platform 100 may be used. Both, onboard and off board sensors 160 may provide data representative of the movable platform's 100 movement through space. Sensors may, for example, be used to detect the movable platform's movement in position or orientation. They may, for example, also be used to detect the length of the cable 150, the angle of the cable at its first attachment point 152 or at its second attachment point 154, or the angle of the cable at its first 156 or second attachment point 158.

Sensor data may be processed using a control module 180. The control module 180 may house electronics for interfacing with the movable platform's actuators 170 and sensors 160. It may be used to control media content (e.g., video content for a screen display).

FIGS. 1B, 1C, and 1D show projections of the sample embodiment of FIG. 1A onto the y-z, x-z, and x-y planes in the body coordinate frame 130, respectively. Ducted fans 190 labeled 1a and 1b provide thrust in the direction of the negative z-axis; fans 2a and 2b provide thrust in the direction of the positive z-axis; fans 3a and 3b provide thrust in the direction of the positive y-axis; and fans 4a and 4b provide thrust in the direction of the negative y-axis in the body coordinate frame 130.

In addition to movement in position, the movable platform can also move in orientation using the ducted fans 190. Roll (i.e., rotation around the x-axis) may be controlled by a relative thrust increase of 1a and 2b over 1b and 2a to rotate the movable platform 100 counterclockwise, or vice versa for a clockwise rotation in roll. Similarly, a relative thrust increase/decrease of 3a and 4b versus 3b and 4a allows for roll control.

FIG. 1E shows a perspective view of a single ducted fan 190 with its direction of airflow 194. The fans' internal propellers' handedness 198 determines the sign of the torque that is transferred to the movable platform 100 on thrust changes. In some embodiments, half of the fans 190 have left handedness and the other half have right handedness, so that when fans 190 facing the same direction produce thrust to move the movable platform 100, half of them rotate in the clockwise direction and half of them in the counterclockwise direction, resulting in a net torque of zero. In some embodiments, fans 1a and 1b rotate in opposite directions (counterclockwise and clockwise, respectively, or vice versa) to allow for separate control of thrust and yaw. Similarly, in some embodiments fans 2a and 2b rotate in opposite directions and, in addition, 2a rotates in the opposite direction of 1a to allow for separate control of roll and yaw in some embodiments.

In addition to controlling its rotation and resulting thrust, the ducted fan 190 is equipped with controllable blades 196 to redirect airflow. In some embodiments, blades 196 are mounted to control airflow into the direction of the positive and negative x-axis, also allowing for forward and backward movement of the movable platform 100 (i.e., movement along the x-axis in the body coordinate frame 130). Moreover, blades on fans 3a, 3b, 4a, and 4b may provide additional yaw control; and blades on fans 1a, 1b, 2a, and 2b may provide additional pitch control.

As will be apparent to one skilled in the art given the benefit of the present disclosure, many other combinations of ducted fan units 190 are possible and allow adaptations to, and optimizations for, a large number of use cases. Moreover, other actuators, such as propellers, can be used for similar effect. While ducted fans 190 combine multiple advantages over propellers (typically including a better thrust to size ratio, higher efficiency, lower risk of collisions with surrounding obstacles, lower risk of injury, and, in some cases, lower noise due to shielding by the shroud) other combinations of elements may be desired to achieve specific goals for a movable platform 100. For example, it may be desirable to replace the large number of individual ducted fans described in FIG. 1A with a smaller number of larger fans (not shown). This may, for example, be achieved by equipping a movable platform 100 with a single ducted fan, with its air intake 192 at least partially positioned below the cable 150 so that any forces generated from its air intake 192 are counteracted by the cable 150. Air flow may then be channeled and controlled using internal fins, vanes, vents, ducts, or valves as appropriate to achieve a topology of actuators that allow for differential thrust and movement in the direction of the x, y, and z-axes as well as actuation in roll, pitch, and yaw as described above.

The movable platform's actuators 170 may be designed to support the movable platform's 100 entire weight. The actuators 170 may move the movable platform 100 such that its angles of attachment at the cable's proximal attachment point (i.e., the first angle of attachment 156) change. The actuators 170 can also move the movable platform 100 such that its second angle (or angles) of attachment 158 change.

Actuation may be greatly simplified by accounting for the movable platform's center of mass 132, by using a suitable weight distribution, or by ensuring proper actuator 170 placement that decouples movements in the x, y, and z directions from torques. A balanced weight distribution may then allow changes in the orientation of the movable platform 100 with little actuation. To aid movement, the cable 150 may be attached at the movable platform's center of mass 132 to reduce the force and torque required to actuate the movable platform 100. Moreover, the cable 150 may be attached away from the center of mass, e.g. vertically above the center of mass 132. This may provide passive stability for certain positions (e.g., when the movable platform 100 is positioned directly below its attachment point to the ceiling) or in a certain direction. Such attachment may also allow creating a partially unstable system that allows for highly dynamic movement. This may, for example, be achieved by using actuators 170 such as ducted fans 190 to maintain the movable platform 100 in an unstable equilibrium.

In some embodiments, cable attachment mechanisms are used that are easy to fasten and unfasten to allow rapid installation and teardown.

In some embodiments, the cable 150 also provides power for the movable platform 100. This may be achieved by using a high voltage power supply, suitable cable (e.g., a pair of small diameter conductive wires, with each wire coated in a flexible insulation material), and corresponding power electronics.

In some embodiments, the cable 150 transmits signals to the movable platform 100. These may, for example, include control signals (e.g., for the platform's on board actuators, for the platform's on board light display), media content (e.g., video content for a platform's on board screen display), parameters, or settings (e.g., camera settings).

In some embodiments, the cable 150 transmits signals from the movable platform 100. These may, for example, include status update signals (e.g., motor current consumption, projector temperature), sensor signals from onboard sensors, timing signals, video signals from an onboard camera, or audio signals from an onboard microphone.

In some embodiments, exchanging signals through a cable may allow to centralize signals of multiple platforms 100. This may, for example, allow to distribute video content from a central server or to receive camera content from multiple platforms 100, or to coordinate the operation of multiple platforms 100.

In some embodiments, movement is defined with respect to a predefined reference frame (e.g., a body coordinate frame 130). The predefined reference frame may be referred to some fixed point. Examples of a predefined reference frame include an "East-North-Up" frame, with the origin fixed to some landmark.

Figure 2A:
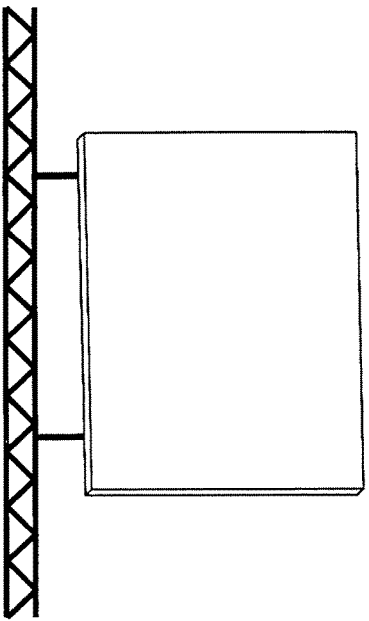
FIGS. 2A to 2C show prior art.
Figure 2B:
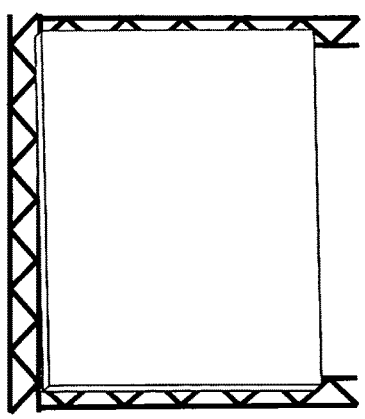
Figure 2C:
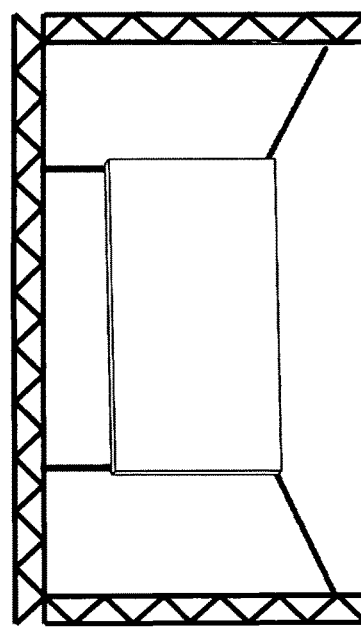

FIGS. 2A to 2C show examples of prior art. FIG. 2A shows a display rigidly attached to a support structure. This is currently the prevalent and preferred method of attachment for displays. Rigid attachment minimizes mechanical complexity. Rigid attachment also avoids display movement. Importantly, no sensing and actuation are required to prevent the display's movement (neither in position nor in orientation).

FIG. 2B shows a display hanging from a supporting truss. This method of attachment is sometimes used for heavy displays in a stage setting because it is easy to install. Motion of the display is minimized by ensuring that the display has a high weight/size ratio and a weight distribution that increases stability (e.g., center of mass positioned far below the attachment point).

FIG. 2C shows a display attached at its four corners. This method of attachment is used to avoid motion of the display, in particular for displays with a low weight/size ratio.

FIG. 3A shows an example embodiment for attaching a movable platform 100 to a support structure 140. The movable platform 100 is connected with a cable 150, which is actuated by a winch 310. The winch 310 has a cable carrier 340 that is used to store excess cable 150. The winch 310 is mounted on a slider 350 that can be moved along a rail 300, which is mounted on a support structure (140, not shown here for clarity).

A winch 310 may be used at either the distal 154 or proximal end 152 of the cable, or both. In many applications, positioning the winch 310 at the distal end may be advantageous. Example of potential advantages include reducing the onboard weight that needs to be moved when moving the platform 100 or reducing the amount of power that needs to be transmitted via the cable 150.

A winch may be active (i.e. actuated) or passive. For example, a spring-loaded passive winch 310 may be used to reel in and let out cable 150 as required. An active winch 310 equipped with a rotary actuator 322, may also be used to the same effect (see FIG. 3B and description below). In some embodiments, an active or passive slider may be used.

Retractile cables 150, such as coiled power cords, may also be used. In some embodiments, the winch 310 is equipped with a rotary encoder 330 that monitors the length of the cable 150. This may be useful to help estimate the position or orientation of the movable platform 100 in space, e.g. by providing an estimate for the distance between the proximal 152 and distal 154 attachment points (for a taut cable) or by providing bounds for that distance (in case of a slack cable). In some embodiments, a mechanism to sense the cable tension is used. This may allow to further help estimate the position or orientation of the platform 100

The slider 350 may be used to move the movable platform in a horizontal direction. For example, a linear actuator 350 moving along a rail 300 may be used. In some embodiments, the slider 350 is equipped with a mechanism to sense its position along the rail (e.g., a linear encoder). This may be helpful to determine the position and orientation of the movable platform.

Figure 3B:
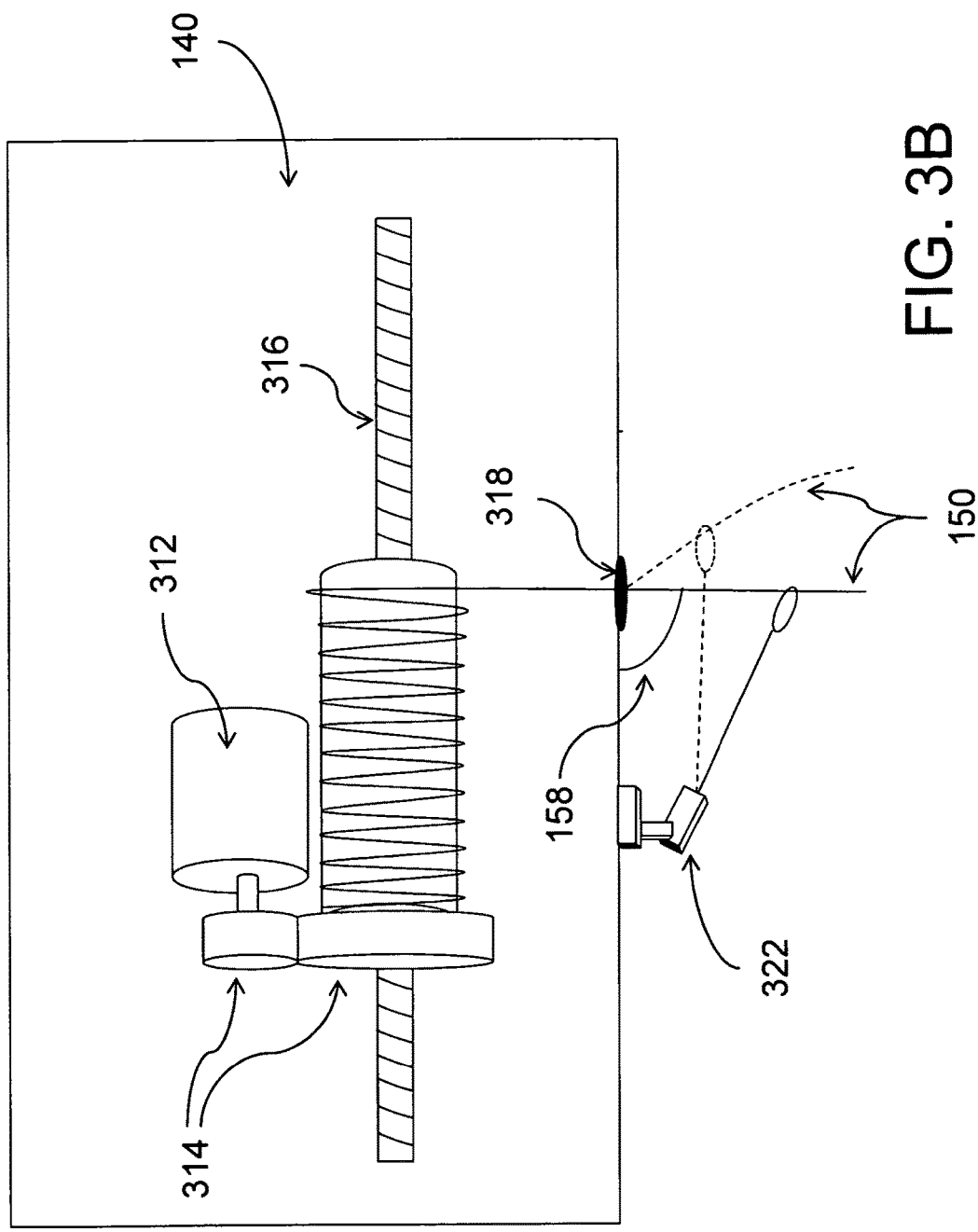

FIG. 3B shows another example embodiment for attaching a movable platform 100 to a support structure 140. In this embodiment an active winch 310 is used. Gears 314 connect the winch to a winch motor 312. The winch is mounted on a screw thread 316. As cable 150 is unwound from, or wound onto, the winch 310, the winch assembly moves along the screw thread 316 to counter-act winding/unwinding such that the cable always exits straight through the guide hole 318 (i.e. without inducing shear stress on the winch).

During the movable platform's movement, the cable's angles of attachment 158 or the cable's rotation in yaw may change. This may be facilitated by using a cable 150 with sufficient flexibility. In some embodiments rotation in yaw may be facilitated by equipping the cable with a suitable rotary mechanical (e.g., universal joints) attachment or electrical contact (e.g., slip rings).

In the embodiment shown in FIG. 3B, a mechanism to sense the cable's angles of attachment 158, such as a 1D or 2D angle encoder 322, is used. In some embodiments, sensors to detect yaw rotation/yaw torque may be used. In some embodiments, attachment points are equipped with encoders suitable to record the length of the cable 330 (e.g. rotary encoders). Such sensor information may be helpful to better determine the position or orientation of the movable platform, in particular when angle and rotary encoders are combined. For example, (i) information on cable length obtained from a rotary encoder, (ii) information on a first cable angle obtained from a first 1D angle encoder, and (iii) information on a second cable angle obtained from a second 1D angle encoder may be combined using an evaluation unit. The evaluation unit can then compute an estimate for the relative position of the platform 100 from its distal attachment point 154 by using the known geometry of the platform, information on the sensor placement, and the sensor information.

Figure 4:
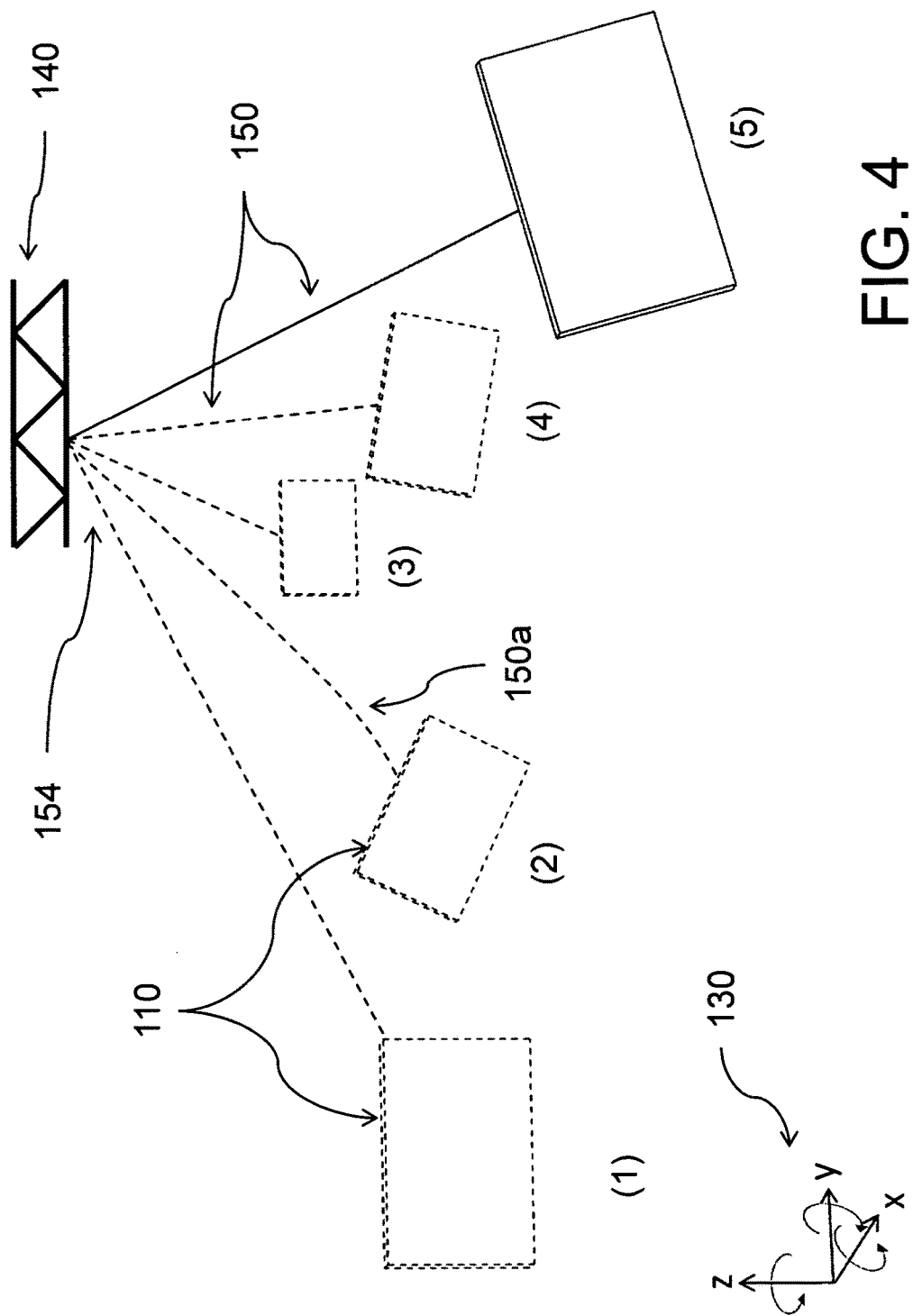
FIG. 4 shows five snapshots of an example embodiment moving along a trajectory through space.

FIG. 4 shows five steps of a movable platform 100 that is performing a movement through space. In step (1) the movable platform 100 is located close to the front of the space. In step (2) the movable platform 100 then tilts to the right and backwards, moving towards the right (i.e., in the direction of the positive y axis) and towards the back of the space (i.e., in the direction of the negative x-axis). During this rapid movement, the cable is loose 150a. This may, for example, be due to constraints on the mechanism reeling in the cable 150 (e.g., the spring's force if a passive mechanism is used or the motor winch's speed if an active mechanism is used). Other potential causes for cables that deviate from a straight line include highly dynamic movement that induces vibrations or oscillations in the cable, or collision with obstacles. Loose cables may also be used for aesthetic or other effects (e.g., so as to not make the platforms appear as puppets or to allow for more freedom of movement).

Following deceleration of its backwards and right motion, the movable platform 100 comes to a stop and returns to the vertical position in step (3). This may be achieved either actively using its actuators or passively through drag or by being restrained by the cable 150. It is then shown tilting forward and to the right to accelerate forward and to the right in step (4). Step (5) shows the movable platform 100 having moved to a position at the front right of the space. As will be apparent to one skilled in the art and given the benefit of the present disclosure, more complex trajectories involving single or multiple movable platforms are possible.

FIGS. 5A to 5D show four example configurations, each consisting of three movable platforms 100 attached to three separate guiderails 300.

FIG. 5A shows the three movable platforms 100 moving along the direction of the y-axis using guiderails 300. This may, for example, be achieved by attaching each of the platform's cables 150 to a slider 350 that may be moved along the guiderail 300. Actuation in the direction of the z-axis may again be provided by a winch 310 to shorten or lengthen the cable 150. In some cases, a setup integrating both the sliding motion along the guide rail 300 and changes to the cable 150 length (i.e., combined actuation of the movable platform in the x and z directions) may be preferable, for example by using a pulley system.

In this present embodiment, care must be taken to achieve accurate control in roll and yaw to avoid collisions between movable platforms 100 as they move along the guiderails 300. While some passive stability in roll may be achieved by placing the attachment point of the cable 150 above the movable platform's center of mass 132, movable platforms 100 are in some embodiments also equipped with actuators 170 structured and arranged to allow active control of yaw and roll.

In the present embodiment, both yaw and roll are actively controlled and may be stabilized using a flywheel 500 (here only shown for the first platform for simplicity). In some embodiments the flywheel 500 is driven by an electric motor. In some embodiments power is supplied through the cable 150.

In this embodiment, actuation in the direction of the positive and negative x-axis is provided by four small propellers 170 that may produce thrust in either direction by spinning clockwise or counterclockwise (here only shown for some platforms 100 for clarity). The same propellers 170 also allow providing fine control for stabilization in roll and yaw by producing differential thrust as explained above.

The pitch of the payload (e.g., a screen display) is here actuated by a gimbal 502 mounted on the back of the payload 110 such that it may rotate the cable's proximal attachment point 152. Here rotation is around the movable platform's 100 center of mass 132 (here only shown on some movable platforms 100 for clarity). The gimbal allows the payload 110 to rotate with respect to the movable platform's 100 main body. A gimbal 502 may be used to allow movement in, or to actuate movement in, one, two, or three degrees of rotation.

Using the mechanisms described above, this embodiment allows this movable platform to be moved and controlled in all three translational and all three rotational degrees of freedom (x, y, z, roll, pitch, and yaw) independently. This allows one or multiple movable platforms to execute complex 6D trajectories in space.

In some embodiments, more complex setups of cables 150, rails 300, sliders 350, translational units, or winches 310, including those commonly used for crane trolleys, gantries, pulley systems, or hoists, may be used or may be usefully combined with the present disclosure.

In some embodiments, when movable platforms 100 are used as screen displays, they may be moved such that their cables 150 do not pass in front of each other's display screens, so that the cable 150 does not become visible to an audience. As a simple example, for movable platforms 100 that hang straight from their cables 150, this may be achieved by ensuring that the lowest visible point of the cable 150 holding the front movable platform 100 (here, the one with the larger y coordinate) is not positioned in or below the display area of the back display (here, the one with the smaller y coordinate). More complex rules may be needed for some embodiments, in particular those where movable platforms 100 or their payloads 110 may perform dynamic motions resulting in cables 150 that are no longer vertical.

In some embodiments it may be preferable to actively control yaw by transmitting torque through the movable platform's 100 connection to the ceiling or support structure 140. This may be achieved by selecting suitable cables 150 (e.g., cable drive shafts, torque wires) or other kinematic chains 150 or mechanical linkages 150 that allow for torque transmission, and by equipping at least one of the attachment points to the movable platform's structure 120 or to the ceiling or support structure 140 with a rotary actuator 170.

In some embodiments, mechanical restrictions to the movable platform's rotation may be achieved by increasing the movable platform's 100 respective moments of inertia in roll, pitch, or yaw. This may be achieved through careful design of the movable platform's 100 or the payload's 110 mass distributions.

FIG. 5B shows the three movable platforms 100 rotating around their yaw, pitch, and roll axes. This may be desirable to achieve specific visual effects or to allow for ease of assembly of multiple movable platforms into a single larger platform. For some applications, rapid rotation may be desired. This may be achieved by motorizing the proximal 152 or distal 154 attachment points with one or more motors 170, by equipping them with a gimbal 502 or by equipping the movable platform 100 with other external or internal actuators 170 (e.g., flywheels 500, momentum wheels, or mechanisms to shift their mass distribution). Here again, movable platforms 100 may be rotated in their entirety or only part of the platform (e.g., only a payload 110, such as a screen display, video camera, panel, gripper, or other payload) may be rotated to achieve a desired motion or effect. In some embodiments this is achieved using a slider, a kinematic chain, or a gimbal.

FIG. 5C shows the three movable platforms 100 moved into position to appear as a single, widescreen display.

FIG. 5D shows the three movable platforms 100 moved into position to appear as a cubic structure.

Assembly may be aided in a variety of ways. In some embodiments assembly of two platforms is aided by a sensor that determines the relative position of the first and second platform. Many types of sensors or their combinations may be used. For example, the following combinations of sensors may be used, with either placed at two of an offline location, a location onboard the first platform, or a location onboard the second platform:

- Camera+active marker (e.g., infrared LED)
- Active camera (e.g., strobing LED)+marker
- Active camera+active marker
- Infrared emitter+infrared sensor
- Combinations of encoders for cable length and cable angle
- Combinations of radio frequency localization technology (e.g., ultra wide band beacons and receivers)
- Radar
- Lidar Once the platforms have been moved close to a desired assembly (e.g., by using a control module, sensors, and actuators), the platform's assembly may be further aided by structural elements 120 equipped with passive, mechanical guides. For example, a groove or slot+tongue, bead, bolt, or dog combination (none shown) may be used to aid precise assembly and provide additional stability. For embodiments that use payloads 110 that are not susceptible to magnetic interference, magnets or electromagnets may be used. Moreover, passive or actuated hooks, clasps, or other fasteners may be used to aid assembly or temporarily lock platforms in place in a desired configuration.

Once a desired assembly has been achieved, the entire assembly may be moved without altering its structure or composition by using sensors 160 to detect the platforms' 100 or its payload's 110 movements, by accounting for the structure's movement constraints (e.g., cables 150, mass distribution, operational limits of actuators 170) and for the constraints including forces and torques between individual platforms 100 or its payload 110 using a continuous, and by computing control signals for the platforms' 100 or payload's 110 on-board or off-board actuators 170, e.g. by using a control module 180.

FIG. 6A shows a display assembled from six individual movable platforms 100 moved into position to form a larger platform. Platforms in this embodiment may be mounted at a roll angle to allow sufficient room for the displacement of cables 150 on the guide rails 300.

FIG. 6B shows a similar display assembly, but with multiple movable platforms 100 sharing a single rail 300. Although this setup results in additional constraints for the platform's 100 movement, it may be preferable for applications that require a simpler setup, less setup time, or cheaper infrastructure.

Figure 6C:
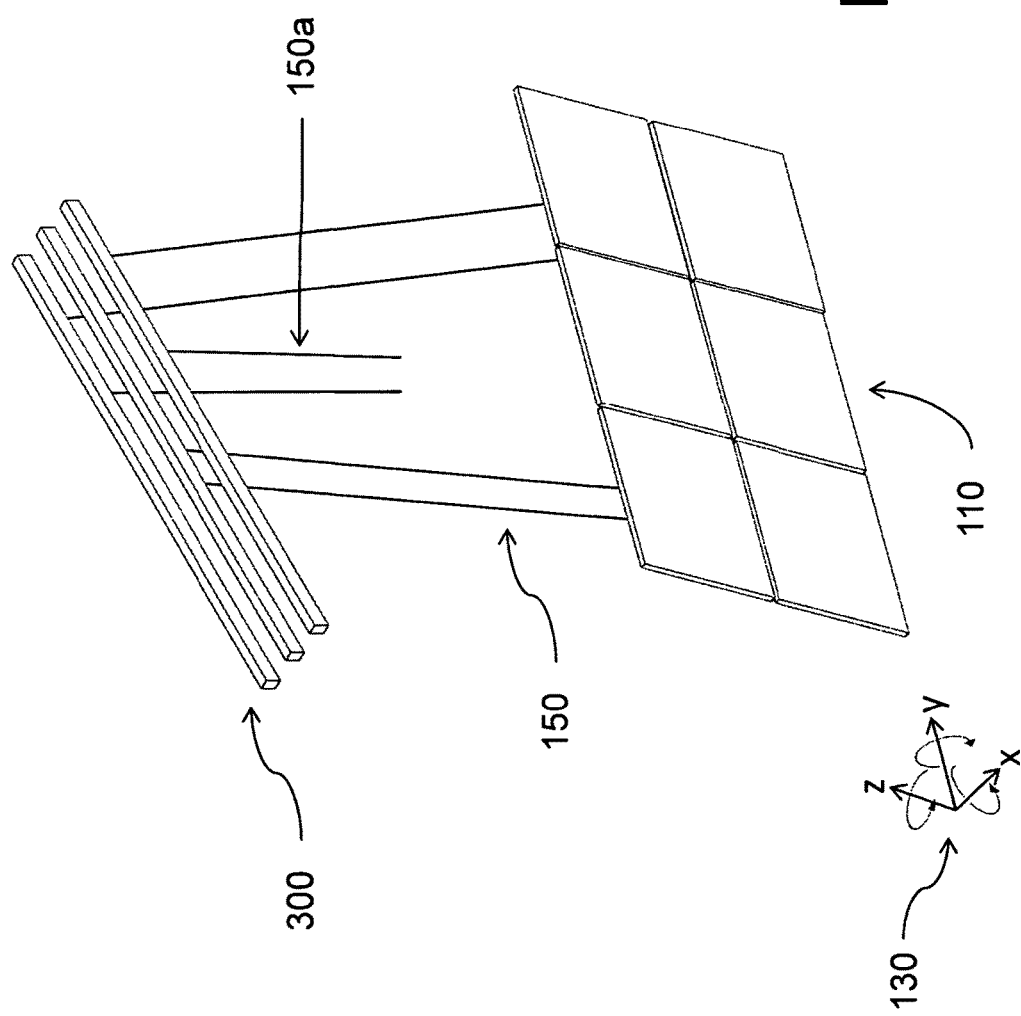
Figure 6D:
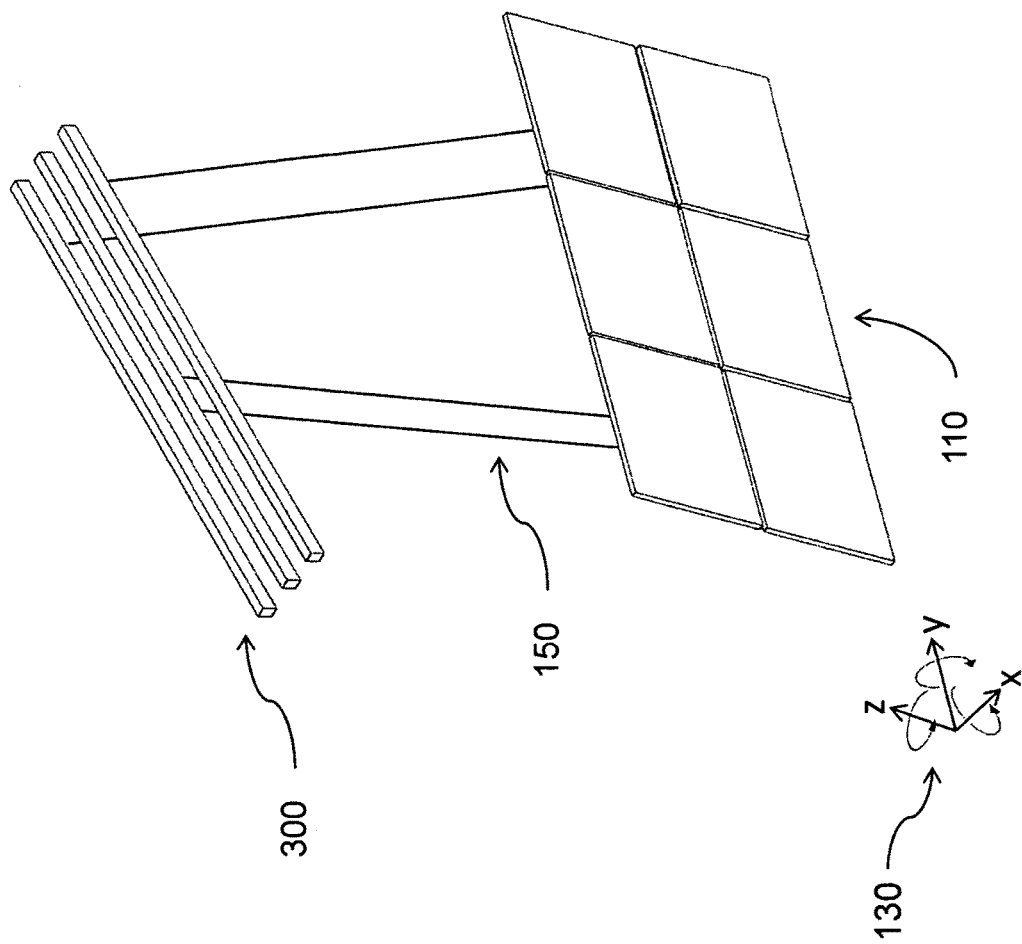

FIGS. 6C and 6D show how some of the cables 150 may be detached 150a and removed. This can be achieved by (i) coordinating the movement of multiple platforms (e.g., using one or more control modules 180), (ii) aligning the multiple platforms (e.g., using mechanical guides such as guide funnels, guide grooves, guide holes, guide slots, guide notches, or other or suitable recesses), (iii) locking the platforms into place (e.g., using dogs, grooves, or cam plates), (iv) detecting successful locking (e.g., using a sensor), (v) unlocking a cable 150 (e.g., using an electrical signal to release a locking bolt), and (vi) retracting the detached cable 150a (e.g., using a winch).

Figure 7A:
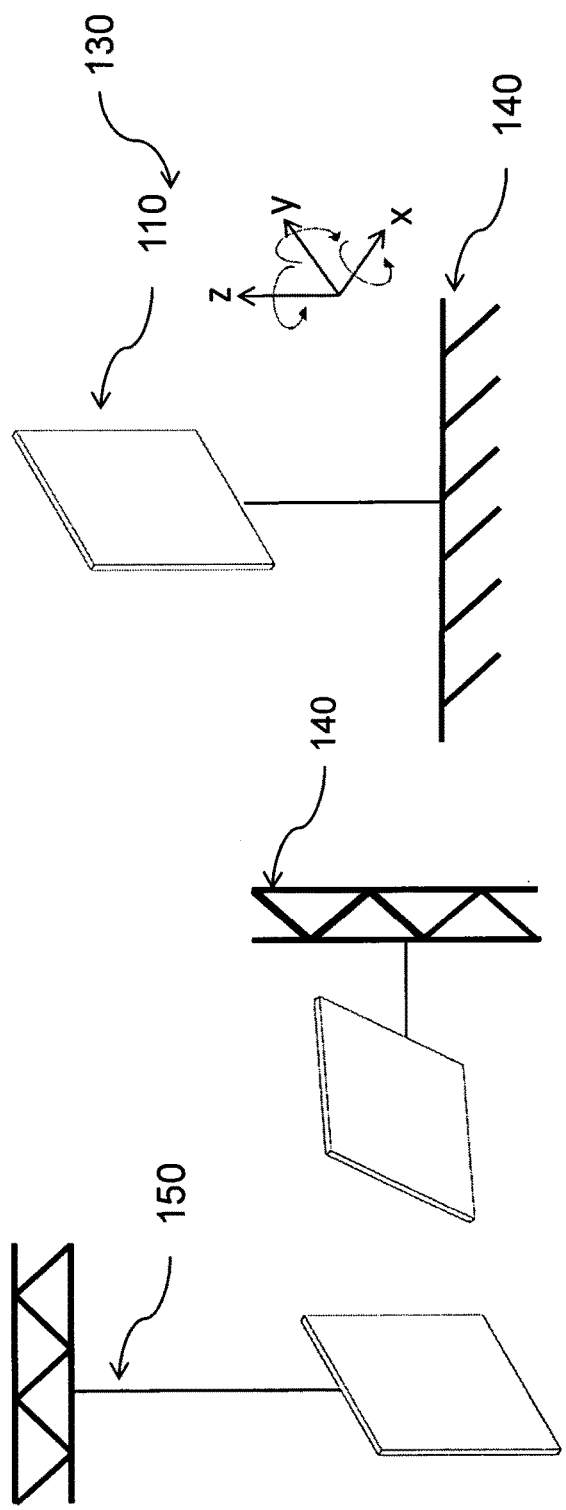

FIG. 7A shows movable platforms 100 that use cables 150 to constrain their movement into various directions. Such constraints to a platform's 100 movement may be useful for specific use cases or applications, such as those that require dynamic or periodic movements.

FIG. 7B shows an example embodiments where the cable 150 is used to restrict the movable platform's rotation in yaw and roll (but not in pitch) as well as its movement in x, y, and z. Combinations of cables may be used to restrict some degrees of freedom by design, for example by using multiple cables 150 with carefully selected attachment points. For example, rotation in roll and yaw may be reduced by attaching two cables at the extremities of the movable platform (i.e. maximizing the attachment points' distance in the y-axis). Cable tension caused by the weight, movement, or actuation of the movable platform 100 will then tend to oppose roll and yaw rotation. Similarly, rotation in pitch and yaw, and in roll and pitch may be reduced by maximizing the attachment points' distances in the directions of the x-axis and in the z-axis, respectively. As another example, movement including rotation may be reduced along a different axis.

In some embodiments, mechanical restrictions to the movable platform's rotation may also be achieved by using linkage assemblies 150 or other kinematic chains 150 in conjunction with, or instead of one or multiple cables 150, allowing for a large variety of mechanical restrictions to be designed that suit a wide variety of use cases.

Figure 7C:
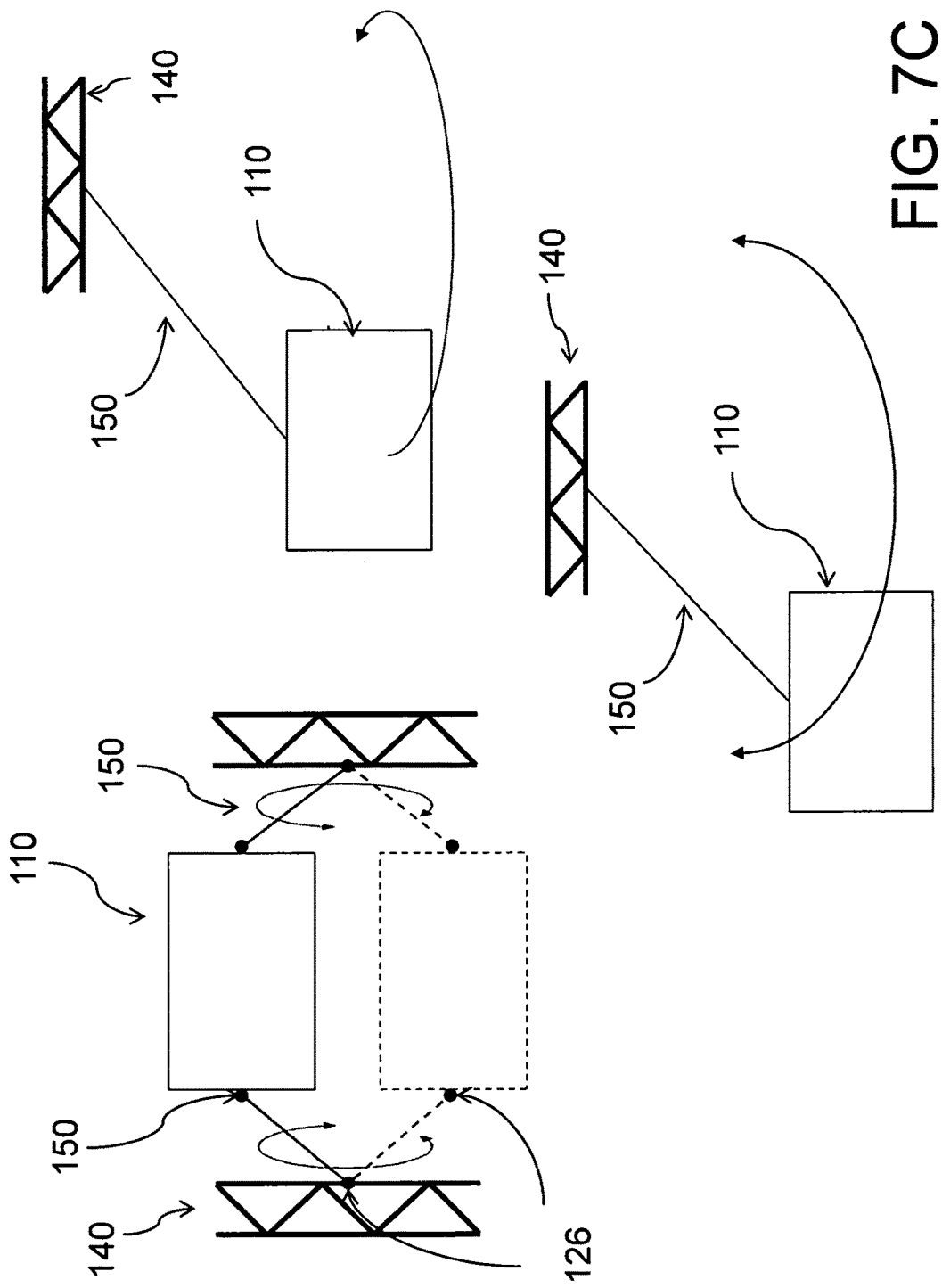

FIG. 7C shows example embodiments to show how mechanical restrictions can also be used to aid certain movements. While mechanical restrictions generally result in a more constrained motion repertoire, their resulting motion dynamics may be exploited for dynamic movement. For example, a cable may be used to constrain the movable platform's 100 movement to a swinging pendulum or another periodic like a circular motion. In some embodiments, this may be achieved using only reaction wheels, movable masses, or other types of internal actuation. In some embodiments, this may be achieved using only onboard actuators. In some embodiments this may be achieved by actuating in accordance with the swinging motion.

As another example, a platform 100 may be structured and arranged to swing between two attachment points 154. In some embodiments, the attachment points are equipped with rotary joints 126. Specific structuring and arranging of the flexible support used in combination with with sensors, actuators, and a control module may be used to constrain the platform's movement to specific dynamic or periodic motions such as a pendulum swing, circle, or eight. Such combinations may also be used to excite specific periodic movements.

FIG. 7D shows example embodiments with multiple platforms 100 used as display screens attached to a single cable 150 or a combination of cables 150. Actuators 170 may be used to control the movable platform's position and orientation independently, subject to constraints (e.g., motion constraints, position constraints, constraints in orientation) imposed by the cable 150 or other constraints (e.g., those imposed by a control module). In some embodiments, coupling of the periodic dynamics of multiple platforms or multiple payloads may be used.

FIG. 8A shows a sample embodiment used in a stage performance. A performer 820 is interacting with the movable platform 100 on a stage 810. The movement of the performer 820 is monitored by a tracking system 830. In this sample embodiment, an optical motion capture system mounted to the ceiling is used. In addition to tracking the motions of the performer 820, the tracking system 830 may also be used to improve the position and orientation estimate of the movable platform 100.

The functionalities of the media/motion coordination station 850 or control systems such as the control module 180 may all be interfaced with or integrated into a show management system such as those commonly used in the live entertainment industry.

FIG. 8B shows a sample embodiment where the platform's payload is a spotlight 890. The platform's movement is remotely controlled by an operator 880. In some embodiments other payloads (e.g., a camera, a light display), including combined payloads (e.g., a camera+screen display) may be used. In some embodiment multiple platforms may be operated on the same stage.

Figure 9:
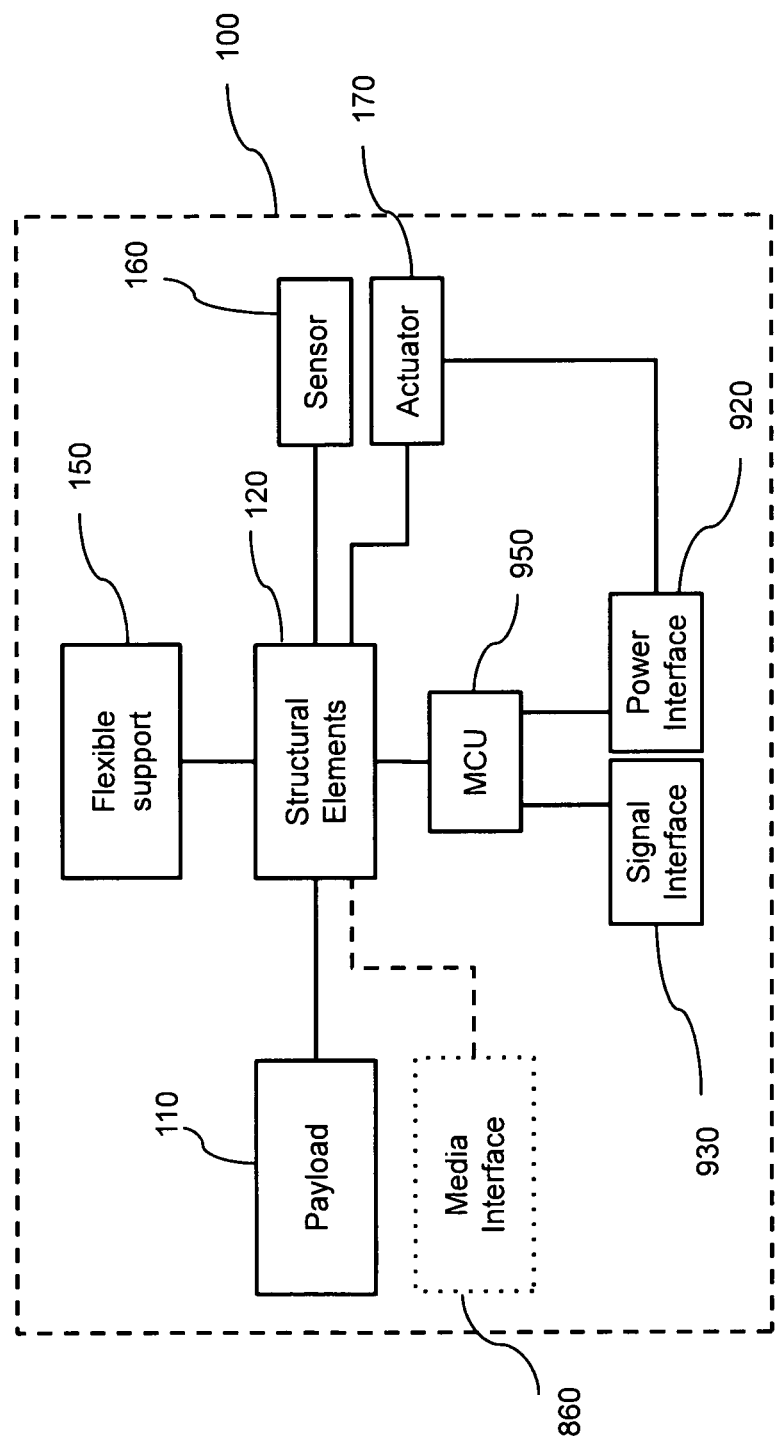
FIG. 9 shows a block diagram used to explain physical connections of a sample embodiment.

FIG. 9 shows a block diagram used to explain physical connections of a sample embodiment 100. Structural elements 120 provide a skeleton for the movable platform 100. They are connected to a flexible support 150 that tethers the movable platform 100.

A payload 110 (here a screen display) is attached using structural elements 120. The platform's media may be exchanged via a media interface 860. The media interface 860 receives or transmits the media, which may be any possible combination of frames (i.e. images or video), audio, or other signals. Examples for media include the electrical input signal of an LCD screen, of a video projector, or of a spotlight. In some cases, e.g. if the media is an electrical signal for an LCD screen or for a rear-projector, the media interface 860 may be located onboard the movable platform 100. In some cases, the media interface 860 may also be situated remote from the movable platform 100.

Sensors 160 or actuators 170 may be attached to other parts of the movable platform 100 using structural elements 120. A Microcontroller Unit (MCU) 950 may also be attached using structural elements 120. An MCU may be used to implement a control module (e.g., a control module's onboard functions). It may acquire information from sensors 160. It may command actuators 170 according to a signal received via the signal interface 930. This may be achieved via a physical connection or wirelessly. Examples for signal interfaces 930 include connectors for electrical cabling optimized for signal transmission. Additionally, the signal interface 930 may be used to send information to the media/motion coordination unit 1245. The MCU 950 and the actuators 170 may be powered through a power interface 920. Examples for power interfaces 920 include connectors for electrical cabling optimized for power transmission.

Figure 10:
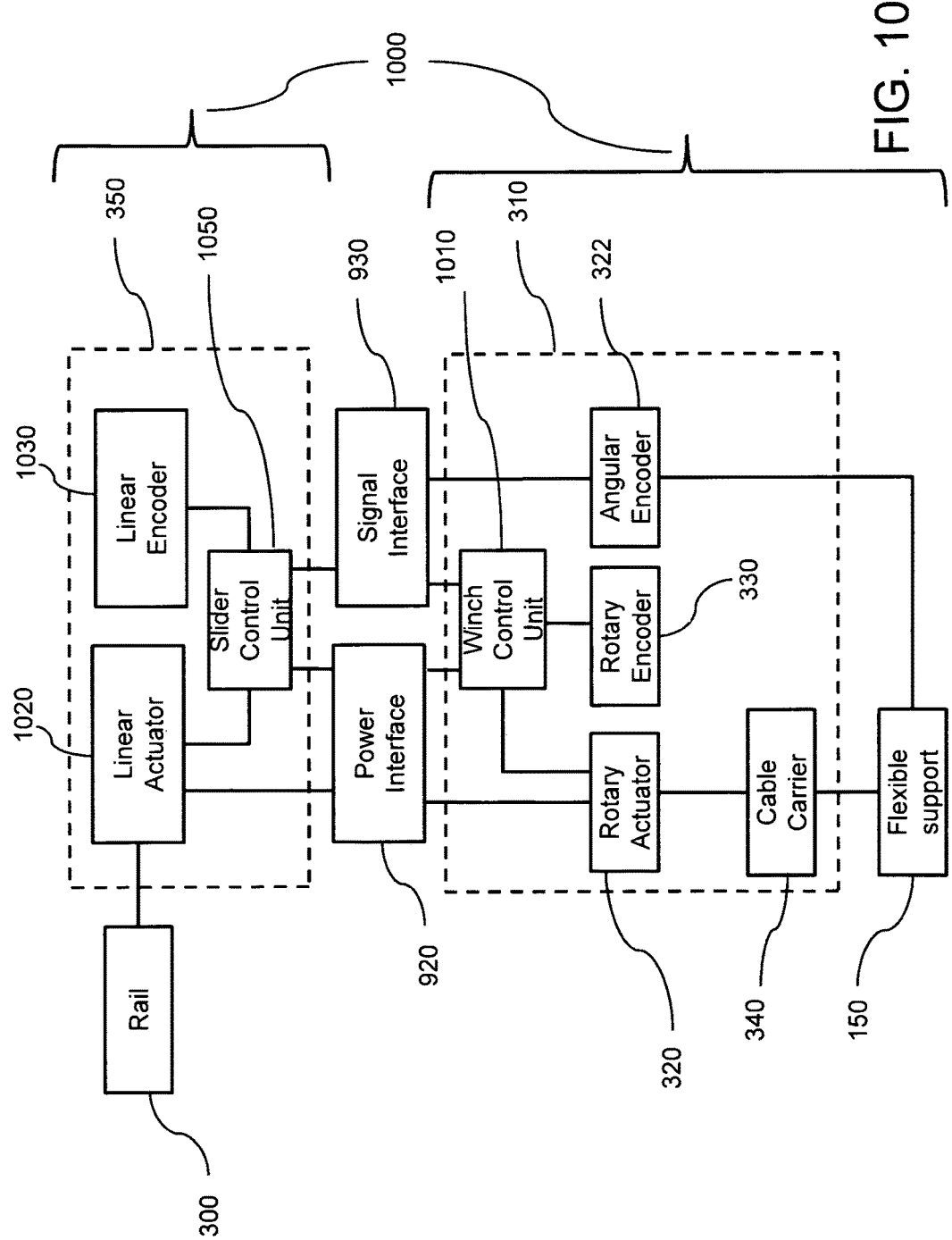
FIG. 10 shows a block diagram used to explain operational connections of a sample embodiment of a translation unit.

FIG. 10 shows a block diagram illustrating operational connections of a sample embodiment of a translation unit 1000. The translation unit 1000 has two main parts, a slider 350 and a winch 310. The slider 350 and winch 310 receive commands through a signal interface 930 and use the same interface to send back data from sensors 160 such as an angular encoder 322. Both entities 310, 350 are powered by a power interface 920.

A winch 310 may be used to translate the onboard part of the movable platform 100 by increasing or decreasing the length of the cable. This may be achieved by a rotary actuator 320 that rotates a cable carrier 340 in order to roll up or release the supporting cable 150. The rotation of the cable carrier 340 may be measured using a rotary encoder 330. A winch control unit 1010 reads the measurements produced by the rotary encoder 330 and controls the rotary actuator 320 based on the commands received from the signal interface 930. Additionally, the winch 310 is equipped with an angular encoder 322 that may provide information about the second angle of attachment 158.

The translation unit 1000 may be used to move the winch 310 along the rail 300. This may, for example, be achieved by means of a linear actuator 1020. The translation of the slider 350 is measured by means of a linear encoder 1030. A slider control unit 1050 reads the measurements produced by the linear encoder 1030 and controls the linear actuator 1020 based on the commands received from the signal interface 930.

In some embodiments, the winch control unit 1010 and the slider control unit 1050 may be combined in a joint control unit. In some embodiments, control may be achieved using a high-level control unit with individual low-level control units.

FIG. 11 shows a block diagram used to explain how a translational unit 1000 may be combined with and controlled with a movable platform in a sample embodiment.

In a simple configuration (configuration A) a single or multiple movable platforms 100 are directly attached to the support structure 140 by means of the supporting cable 150. A media/motion coordination unit 1245 is in charge of coordinating the movable platform 100. The two entities 1245, 100 interact through the signal interface 930, which is used to send and receive information. Both the movable platform(s) 100 and the media/motion coordination unit 1245 are powered through the power interface 920, which is connected to a power source 1120. In this configuration the rail 300 and the translational unit 1000 are not used.

At least three possibilities exist:
Each movable platform 100 is attached to a dedicated supporting cable 150.
All movable platforms 100 are attached to a single supporting cable 150.
Several supporting cables 150 support one or more movable platforms 100.

In this configuration a single media/motion coordination unit 1245 may be used to command all movable platforms 100.

A second configuration (configuration B) requires the use of a translation unit 1000. The translation unit 1000 is mounted on the support structure 140 and is not equipped with a slider 350. In this configuration the movable platform 100 is connected to the translation unit's winch 310 by means of the supporting cable 150. The same media/motion coordination unit 1245 that commands the movable platform 100 may also command the translation unit 1000. Translation unit 1000 and media/motion coordination unit 1245 exchange information through a signal interface 930. A power interface 920 provides power to the translation unit 1000. In this configuration the rail 300 is not used.

Similarly, to configuration A, multiple movable platforms 100 can be used. At least three possibilities exist:
Each movable platform 100 is attached to a dedicated translational unit 1000.
All movable platforms 100 are attached to a single translational unit 1000.
Several translational units 1000 are attached to one or more movable platforms 100.

In this configuration a single media/motion coordination unit 1245 may command all the movable platforms 100 and translational units 1000.

A third configuration (configuration C) is similar to configuration B, but the translation unit is equipped with the slider 350 and not with the winch 310. In this configuration a rail 300 is mounted on the support structure 140 and the slider 350 allows the translation unit 1000 to move along the rail 300. In this configuration the movable platform 100 is connected to the translation unit's slider 350 by means of the supporting cable 150. The same media/motion coordination unit 1245 that commands the movable platform 100 may also command the translation unit 1000. Translation unit 1000 and media/motion coordination unit 1245 exchange information through a signal interface 930. A power interface 920 provides power to the translation unit 1000.

Similarly, to configuration B, multiple movable platforms 100 can be used. At least three possibilities exist:
Each movable platform 100 is attached to a dedicated translational unit 1000.
All movable platforms 100 are attached to a single translational unit 1000.
Several translational units 1000 are attached to one or more movable platforms 100.

In this configuration a single media/motion coordination unit 1245 may command all the movable platforms 100 and translational units 1000.

A fourth possible configuration (configuration D) is the combination of configuration B and configuration C. The translation unit 1000 comprises both a slider 350 and a winch 310. As in configuration B, the supporting cable 150 connects the winch of the translation unit 1000 and the movable platform 100. The same media/motion coordination unit 1245 that commands the movable platform 100 may also command the translational unit 1000.

Configuration D also allows the installation of multiple movable platforms 100. The following are only some of the possibilities.

Each movable platform 100 is attached to a dedicated translational unit 1000. All the translation units 1000 are mounted on a singular rail 300.
All the movable platforms 100 are attached to a single translational unit 1000, which is mounted on a rail 300.
Several translational units 1000 support one or more movable platforms 100. All the translation units 1000 are mounted on a singular rail 300.
The three possibilities above can be adapted to use several rails 300.

As will be apparent to one skilled in the art and given the benefit of the present disclosure, the combinations of one or more movable platforms 100 with one or more rails 300, translational units 1000 (including one or more of a winch 310 or a slider 350), or media/motion coordination units 1245 as outlined above allow adaptations to, and optimizations for, a large number of use cases. In particular, the above provides the mechanical and operational means to create complex choreographies. Such choreographies may, for example, have dozens or hundreds of movable platforms perform complex 3D or 6D trajectories in space.

The movable platform's control architecture is largely omitted in FIG. 11 for clarity.

Figure 12A:
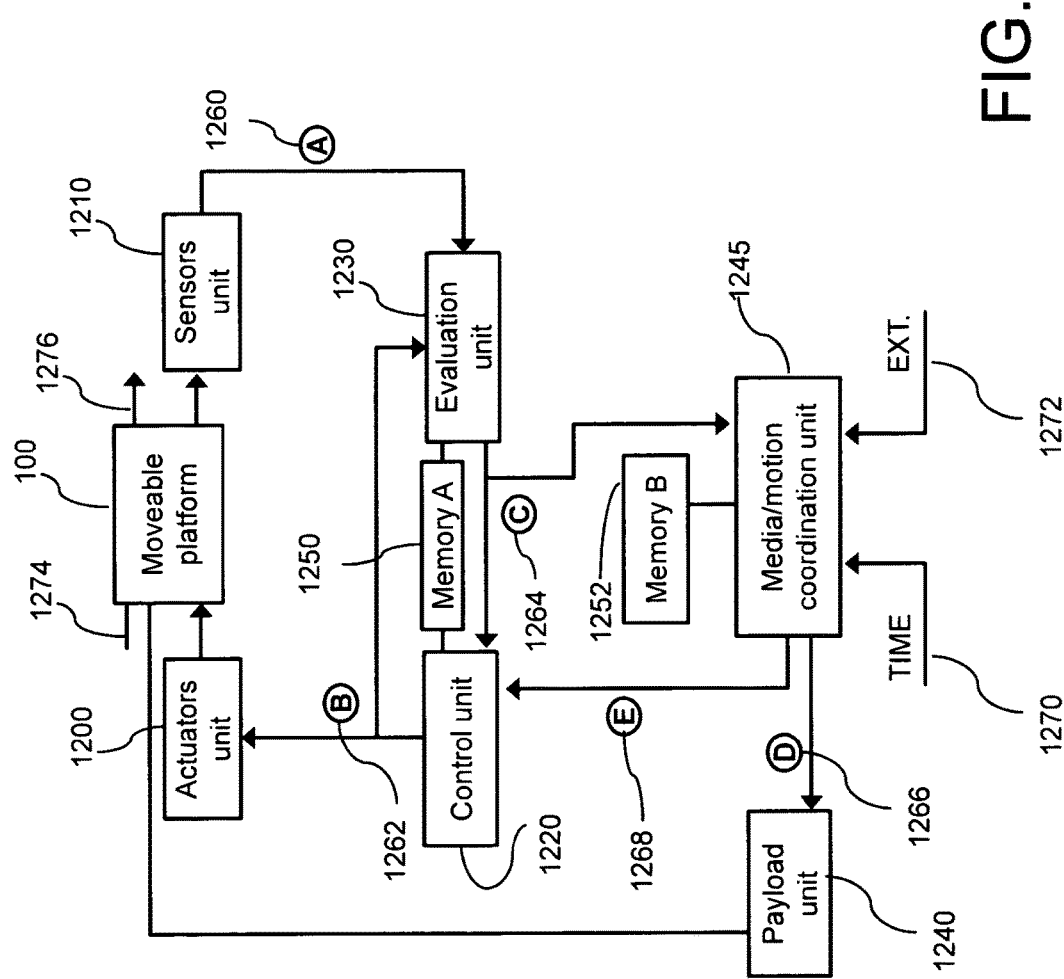
FIGS. 12A to 12C show control architectures for example embodiments and flow charts describing a control flow.

FIG. 12A shows a closed loop control scheme that may be used with some embodiments, where the movable platform 100 is equipped with a sensor 160, an actuator 170, and a payload 110.

A control module 180 receives signals from a sensor, processes the sensor signals, computes output signals based on the processed sensor signals, and produces signals to control an actuator. This is achieved by using a sensors unit 1210, an evaluation unit 1230, a control unit 1220, and a reference signal 1268. The control module 180 may further comprise an actuators unit 1200, a first memory 1250, a second memory 1252, a media/motion coordination unit 1245, or a payload unit 1240. A control module 180 may be implemented in a single location or in a distributed fashion. All, some, or none of its parts may be onboard the movable platform 100.

A sensors unit 1210 collects data from a sensor and produces an output signal. For example, it may receive data from an onboard camera and output a camera image along with the locations of faces detected in the image. It may collect data from a single sensor or from multiple sensors.

In some embodiments micro-electro-mechanical systems (MEMS) or piezoelectric systems may be used to allow achieving operating characteristics outlined in the present disclosure. Examples of such micro-sensors that can be usefully employed with the present disclosure include MEMS gyroscopes, MEMS accelerometers, piezoelectric gyroscopes, and piezoelectric accelerometers. In some embodiments the use of micro-sensors allows using one or more inertial measurement units (IMUs), which each combine multiple gyroscopes and accelerometers or use multiple-axis gyroscopes and accelerometers, in each subsystem. In some embodiments the use of micro-sensors enables to achieve specific characteristics for a highly dynamic platform, which may combine low weight and low power requirements with high performance. For example, a MEMS gyroscope may be used to monitor a platform's attitude and to allow triggering a signal if an attitude threshold is exceeded. As another example, a MEMS gyroscope may be used to control a small platform around hover in spite of its low time constant. MEMS sensors have advantages, including for example their lower weight and lower power consumption compared to traditional sensors, which may be a precondition to equip platforms with multiple subsystems.

A control unit 1220 is used to control the platform. It generates control signals for the platform's actuators in dependence of the platform's sensors. It may receive sensor signals from a sensors unit 1210. It may output control signals to an actuators unit 1200.

The control unit may implement control laws that are well-established in the prior art and widely used. Examples of such control laws include PID control; model predictive control; sliding mode control; full state feedback; and backstepping control. Depending on the control law, the control unit may use state estimates provided by an evaluation unit 1230.

A control unit 1220 may compute control signals for a single actuator. In some embodiments a control unit computes different sets of control signals for different sets of actuators. For example, a control unit may compute a first set of control signals for two actuators of a first platform and a second set of control signals for a second platform.

The control unit 1220 of one platform may furthermore use data related to sensors signals of another platform to improve performance. This may be achieved by forwarding that data using one or more media/motion coordination units 1245. Such combination of data from sensors of multiple platforms may be used to improve signal quality (e.g., signal to noise ratio). This may, for example, be achieved by means of filtering both signals jointly to reduce noise and improve outlier rejection. This may be particularly useful for improving the accuracy of relative position or orientation estimates, e.g. when assembling multiple platforms.

An evaluation unit 1230 uses sensor information to evaluate and estimate the state of the movable platform 100. This may be achieved by processing sensor data (e.g., received from a sensors unit 1210). Sensor data may be processed in combination with data received from a memory. For example, an evaluation unit 1230 may estimate the platform's current position and orientation relative to an inertial reference frame. As another example, it may estimate the platform's current velocity relative to the distal attachment point 154. As yet another example, it may estimate a slider's 350 velocity relative to the movement of a performer on stage. An evaluation unit may also evaluate and estimate the state of the platform's payload. For example, it may estimate the current position and orientation of a screen display payload 110 mounted on the platform 100.

An evaluation unit may implement filtering algorithms or state estimation algorithms that are well-established in the prior art to filter sensor signals or estimate the state of the platform from the sensors signals. Examples include Kalman filtering; extended Kalman filtering; particle filtering; unscented Kalman filtering; and complementary filtering. Further examples include signal processing techniques that remove some unwanted component or feature from a signal (e.g., a low pass filter). In some embodiments a state estimate is used to describe the state of a platform or one of its parts. In some embodiments a state estimate includes position. In some embodiments a state estimate includes orientation. In some embodiments a state estimate is made using spherical coordinates. In some embodiments a state estimate includes the platform's rotation and angular velocity. The control unit 1220 may then use such estimates, e.g., in an attitude controller. In some embodiments the state estimator estimates both a rotational and a translational state. In some embodiments estimates are made for parts of the platform (e.g., the cable, the payload).

The media/motion coordination unit 1245 computes a reference signal for a control unit. The media/motion coordination unit 1245 coordinates the movement of the movable platform 100 with other content. For example, it may coordinate the movement of multiple platforms 100 with a trigger signal (e.g., start of a concert, start of media content such as music emitted by an onboard speaker, reception of an operator signal). As another example, it may coordinate the interaction between a movable platform 100 and a performer. As another example, it may receive commands from an operator 880. In some embodiments an operator 880 may use a remote control to send commands to the platform 100 (e.g., providing a reference signal). As another example, it may coordinate the interaction between a movable platform 100 and other effects, such as media content (e.g., video streams, lights, sounds), motion of stage equipment (e.g., other platforms 100, motion of pan-tilt units, stage lifts), motion of performers (e.g., interaction between a dancer and the platform), or desired motion of a payload (e.g., as commanded by a user). The coordination of the platform's movement is achieved via a reference signal sent from the media/motion coordination unit 1245 to one or more control units. In some embodiments, a media/motion coordination unit 1245 may be implemented on a media motion coordination station 850.

In this context, a choreography is a time sequence of movements for a platform or its payload. It may, for example, include positions, velocities, or orientations. It may, for example, include parameters, settings, effects, or media. A choreography may define a desired time sequence of one platform or for multiple platforms. In some embodiments a parameterized choreography is used. For example, the position of a performer on stage may be used to constantly redefine the center point of two movable platforms 100 circling each other, and may simultaneously interactively define the center point for a spotlight illuminating a performer.

Coordination can also be achieved in real-time. This may be necessary because the physical interaction of the performer 820 with the movable platform 100 may make its motion partially unpredictable. Another example that may require real-time coordination is a live music performance. Here, the movable platform's payload 110 is a projection screen and video media is provided by a media interface 860 (here a projection-mapping system 862) from a fixed position on the stage. Sound media is provided via speakers 840. Coordination is achieved by tracking the position and orientation of the movable platform 100 and by using a media/motion coordination unit 1245. A media interface 860 (here a projection-mapping system 862) then uses the estimated position and orientation of the movable platform 100 to actuate mirrors and related optics (not shown) to project onto the moving screen display.

A payload unit 1200 produces a signal suitable for a payload based on inputs from a media/motion coordination unit 1245 or from a control unit 1220. For example, if the payload is a screen display, a payload unit 1240 may be used to process and output a video stream. As another example, if the payload is a gimbaled camera, the payload unit may output control commands for the gimbal. In some embodiments, a payload unit may also provide feedback signals, e.g. to an evaluation unit 1230.

An actuators unit 1200 produces a signal suitable for an actuator based on a control signal received from a control unit 1220. Examples include an electronic speed controller (also called "motor controller"). For example, brushless motors typically use a motor controller to convert a control input into an amplitude, waveform, and frequency required to achieve a desired rotor speed. Such motor controllers typically contain 3 bidirectional outputs (i.e. frequency controlled three phase output), which are controlled by a logic circuit, but can have more complex implementations involving additional sensors and electronics to achieve high performance or other desirable properties. In some embodiments, an actuators unit may also provide feedback signals, e.g. to an evaluation unit 1230.

Figure 12B:
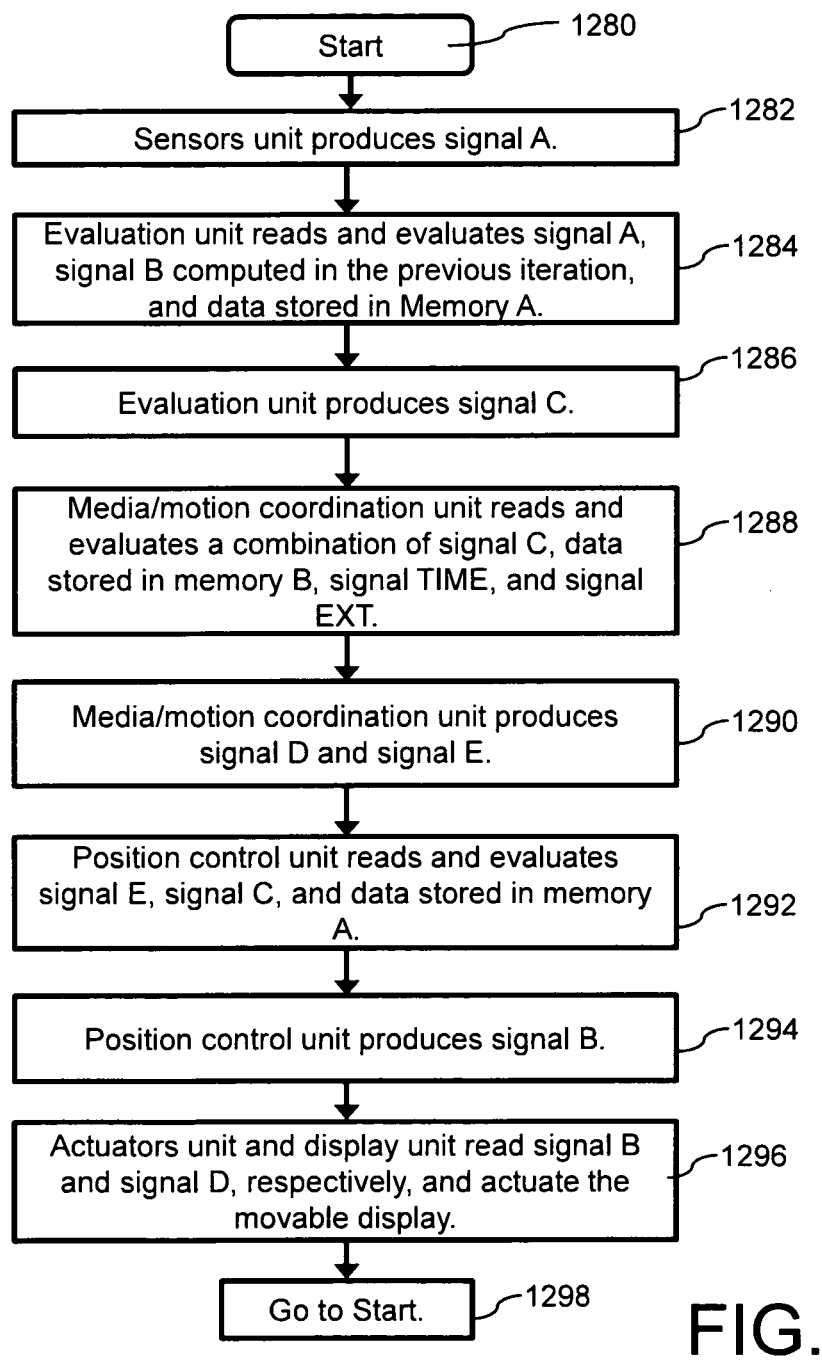

FIG. 12B shows an example control flow. The example control flow consists of the following steps:

1. A sensors unit 1210 reads the information produced by the sensor and produces as output signal A 1260.
2. The evaluation unit 1230 acquires the information required for its computation, which consists of signal A 1260, signal B 1262, and the data stored in memory A 1250. Signal A 1260 represents the information coming from the sensor. Signal B 1262 represents the desired action sent to the actuators unit 1200 during the previous iteration. Memory A 1250 stores configuration parameters and the results produced by the evaluation unit 1230 during the previous iteration.
3. The evaluation unit 1230 uses the information acquired during step (2) to evaluate and estimate the state of the movable platform 100 (e.g., its current position and orientation or the position and orientation of its payload 110). These results are produced as output and transmitted in signal C 1264.
4. The media/motion coordination unit 1245 acquires the information required for its computation, which may consist of signal C 1264, the data stored in memory B 1252, signal TIME 1270, or signal EXT 1272 (note that not all these inputs have to be present). Signal C 1264 is the output produced by the evaluation unit 1230. Memory B 1252 may, for example, store configuration parameters or a description of a choreography (i.e. motion plus media) that the movable platform 100 should execute. Signal TIME 1270 provides a signal representative of time (e.g., a clock pulse) that may be used to estimate a relative or an absolute time value. Signal EXT 1272 is a reference that may be used in conjunction with, or instead of, memory B 1252 to acquire the desired position or desired media, settings, or parameters for the payload (e.g., for a screen display).
5. In this embodiment, the media/motion coordination unit 1245 uses the information acquired during step (4) to compute a desired media for a screen display payload (signal D 1266) and the platform's desired reference state (signal E 1268, e.g. including desired position, velocity, attitude, rotational rate). The information acquired in step (4) may, for example, be processed in one of the following modes:

The movable platform 100 executes a reference choreography loaded from memory B 1252. In this mode motion and media are played back based on signal TIME 1270. The choreography description allows the media/motion coordination unit 1245 to retrieve the desired screen display position and the desired screen display media for a precise point in time. In this mode signal EXT 1272 and signal C 1264 are not used.

The movable platform 100 executes a reference choreography received via signal EXT 1272, which specifies the desired display position and the desired media. In this mode signal C 1264, signal TIME 1270, and the choreography description stored in memory B 1252 are not used. The media/motion coordination unit 1245 simply forwards the information received from signal EXT 1270 to the control unit 1220 and to the payload unit 1240. This mode allows the choreography to be changed at run time (i.e. it doesn't have to be pre-stored and can change at any time).

The movable platform 100 interacts with an external body (e.g. a performer 820, or a member of the audience 790, or another movable platform 100) and executes a choreography based on the interaction. In this mode the media/motion coordination unit 1245 defines the desired media based on the position of the payload 110 received from signal C 1264. In an example use case, the payload 110 used is a screen display that acts as a window and shows a different landscape based on how it is moved. In this mode the screen position can be controlled or not controlled. In this mode, signal TIME 1270, signal EXT 1272, and the choreography description stored in memory B 1252 are not used.

6. The control unit 1220 acquires the information required for its computation, which consists of signal C 1264, signal E 1268, and the data stored in memory A 1250. Signal C 1264 is the output produced by the evaluation unit 1230. Signal E 1268 is the output produced by the media/motion coordination unit 1245. Memory A 1250 may for example store configuration parameters.
7. The control unit 1220 uses the information acquired during step (6) to compute the desired action sent to the actuators unit 1200 (signal B 1262).
8. The actuators unit 1200 and the payload unit 1240 read signal B 1262 and signal E 1268, respectively, and actuate the movable platform 100.

In addition to the actuators unit 1200 and payload unit 1240, the movable platform 100 is also influenced by external disturbances 1274. The movable platform 100 may also produce forces 1276 that can affect, and it may be affected by, the surrounding environment (e.g., a performer, an obstacle, or another platform).

As will be apparent to one skilled in the art given the benefit of the present disclosure, other architectures than that outlined in FIGS. 12A and 12B are possible and allow adaptations to, and optimizations for, a large number of use cases.

For example, in some embodiments the movable platform's or its payload's movement may be a function of the media.

In some embodiments coordination of motion and media may be greatly simplified by using a fixed time sequence of motions and media (i.e., a fixed choreography) for a performance. The media/motion coordination unit 1245 may then be used to coordinate time coded motion and media sequences. This may, for example, be achieved by sending a common start signal for a scene, or by providing a common clock reference signal for motion and media.

Figure 12C:
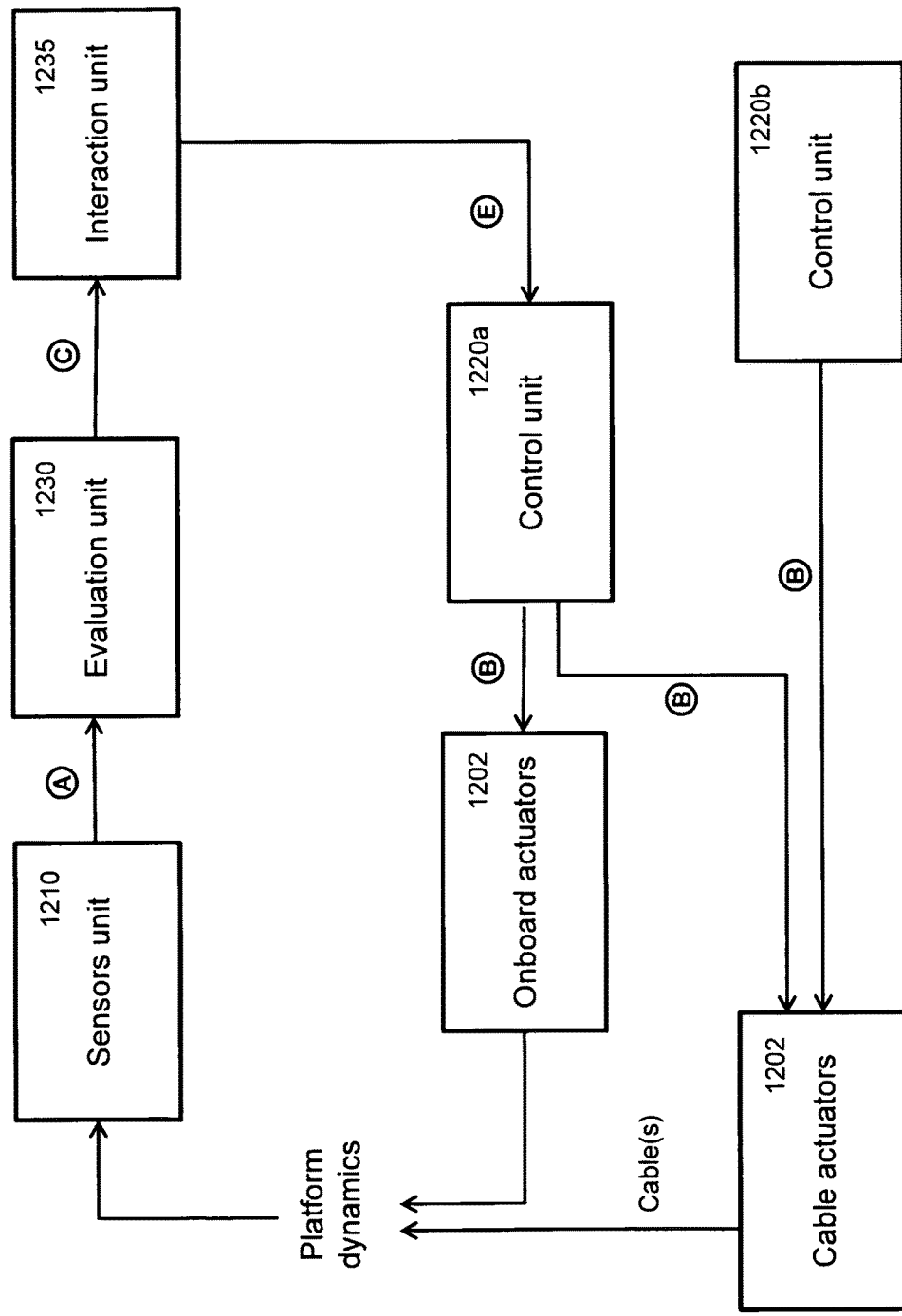

FIG. 12C shows an example embodiment of a control module 180. A sensors unit 1210 provides signals representative of a platform's 100 movements (signal A 1260). An evaluation unit 1230 is then used to provide a state estimate (Signal C 1264) to an interaction unit 1235. The interaction unit 1235 may perform a function similar to that of a media/motion coordination unit 1245. For example, the interaction unit 1235 may provide a reference signal (Signal E 1268). A first control unit 1220a then computes control commands (Signal B) to achieve the desired action to the actuators 1202. Additional control inputs may be provided by a second control unit 1220b (e.g., commands from an operator).

Figure 13A:
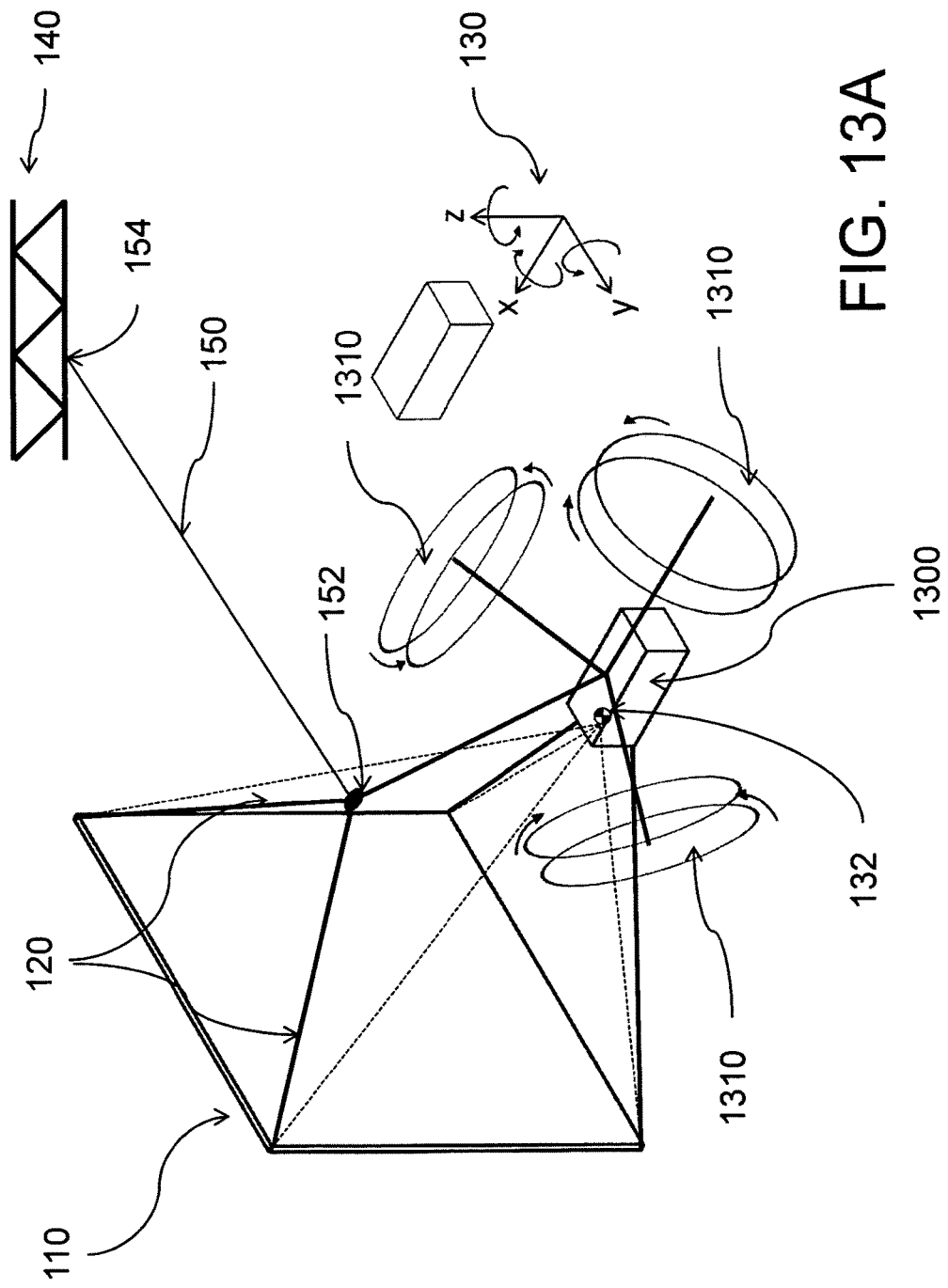
FIGS. 13A and 13B show sample embodiments with various mechanisms for actuation, including an embodiment used in conjunction with a rear projection system.

FIG. 13A shows a movable platform 100 with a screen display payload 110. It is attached to a support structure 140 (e.g., mounted on the ceiling) with a cable 150. A series of propellers 170 provide actuation. They are attached to a display screen and to the cable 150 using structural elements 120. A projector 1300 rear-projects video content onto the screen display. A control module 180 houses the necessary electronics for the control of the movable platform 100 and the control of the video content. The control module 180 receives signals from onboard sensors 160. The control module 180 may also receive video content from a memory or from a data link (e.g., through the cable 150 or via a wireless link).

The movable platform 100 is actuated by a series of propellers 170, which allow the screen to be moved in the direction of the positive and negative x, y, and z-axes in the movable platform's body frame 130 by generating thrust. Actuation in the direction of the z-axis may also be accomplished or supported by changing the length of the cable 150, for example by installing a motor-driven winch 310 to wind up or unroll cable 150 from a cable carrier 340, either mounted on the support structure 140, or mounted on the movable platform 100.

In some embodiments, a counter-rotating propeller 1310 setup is used, consisting of pairs of propellers rotating in the clockwise and the counterclockwise direction. This allows cancelling out rotation in their yaw axes. In some embodiments three pairs of counter rotating propellers 1310 are used mounted orthogonally to each other and providing thrust in all three degrees of freedom and torque to actuate all three rotational degrees of freedom. In some embodiments, the counter-rotating propellers 1310 are mounted so that their thrust vectors pass through the center of mass 132 of the movable platform 100 so that no additional torques around the other axes are created. Additional propellers may be added to improve actuation in specific directions.

The counter-rotating propellers 1310 in this sample embodiment are rigidly attached to the platform 100 using structural elements 120. For many use cases, the main considerations may be around movement of a platform's payload 110 (e.g., a screen display, camera, etc.) rather than around movement of the complete movable platform 100. Movement limitations may be overcome by decoupling the payload's movement from that of the movable platform's 100 main body. This may, for example, be achieved by moving the movable platform using onboard propellers 170 and by replacing a rigid payload attachment point with a gimbal 502. In some embodiments, an actuated gimbal 502 is used. In some embodiments, such a gimbal 502 may be controlled by the movable platform's control module 180 to allow a tight coupling of the actuators' 160, platform's, and gimbal's 502 movements to allow motion decoupling of the platform's and payload's movements. In some embodiments, decoupling may also be achieved using a media/motion coordination unit 1245. In some embodiments decoupling may also be achieved through software. For example, a media/motion coordination unit 1245 may be used to rotate a video stream output based on the platform's movement. This may, for example, be achieved by having the media/motion coordination unit 1245 receive input on the platform's motion from an evaluation unit 1230, passing the content and desired stream processing (e.g., a desired video stream rotation) to the payload unit 1240, and having the payload unit 1240 process and output the updated video stream to a screen display payload 110. In some embodiments the output of an evaluation unit may be stored alongside the video recorded by a camera onboard the movable platform for later processing (e.g., correction of the video content for the platform's motions).

Figure 13B:
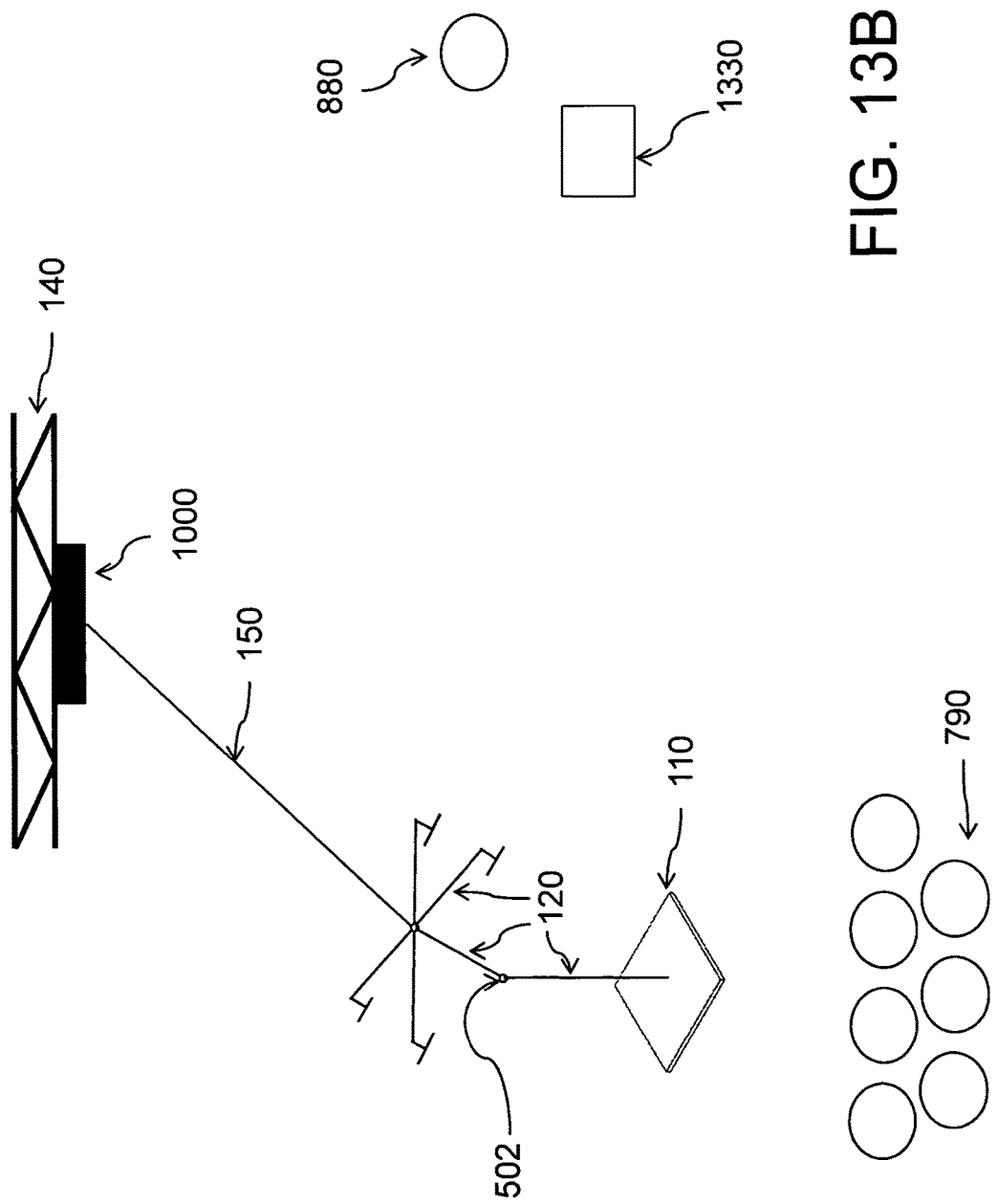

FIG. 13B shows an example embodiment 100, suspended from a ceiling using an elastic cable 150, with a screen display payload 110. The screen display 110 is oriented downward towards a group of spectators 790. The screen display 110 is attached to the multicopter using a gimbal 502. This allows to decouple the multicopter's movement from that of the screen display.

In this embodiment, onboard actuation is provided by an inverted multicopter (here, a quadcopter), pulling the platform 100 downwards, towards the audience 790 by stretching the elastic cable 150. This example setup allows providing a downward facing screen display that can be moved closer or further away from an audience below.

Figure 14:
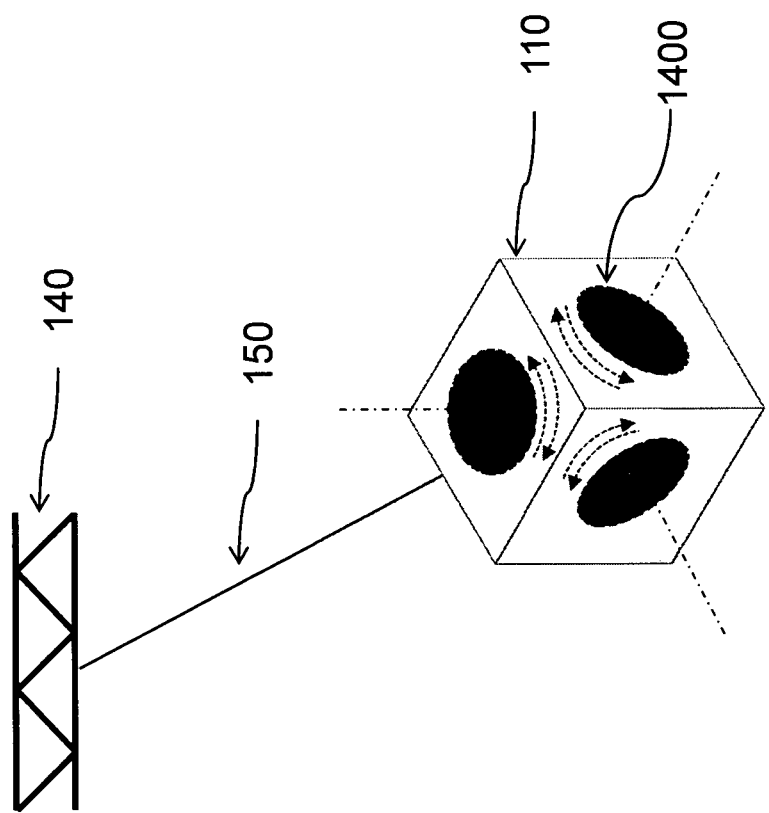
FIG. 14 shows a sample embodiment with internal actuation.

FIG. 14 shows an example embodiment using internal actuation. A first momentum wheel 1400 provides torque in roll; a second momentum wheel 1400 provides torque in pitch; and a third momentum wheel 1400 provides torque in yaw. Excess torque can be shed through the cable 150. In some embodiments, a cable 150 with high torque transmission, such as a torque wire, is used to improve the ability to shed torque in yaw. In this embodiment large movement can be achieved even without powerful actuators by exploiting periodicity of the platform's motion (e.g., pendulum motion in one or two dimensions).

FIGS. 15A to 15D show example embodiments where pressurized air is generated off-board by a compressor 1500 and piped to the movable platform through adequate cabling 150.

In some embodiments, cabling uses flexible high-pressure air hoses 150 to transport the compressed air. High-pressure hoses that may be suitable include those used in the automotive industry for air conditioning systems, those used for compressed air intake for machinery in industrial applications (e.g., air brakes, air guns, compressors and other air tools) or those used for scuba diving and related applications. This setup may be preferable for applications that do not require large amounts of thrust (e.g., light display screens, no highly dynamic maneuvers, or use of periodic movement) and when noise emissions are to be kept to a minimum.

FIG. 15A shows a movable platform 100 in the shape of a cylinder, with a screen display around its outside. Two sections at the top and bottom of the cylinder are equipped with air nozzles 1510 hidden behind blades 196. Depending on the design of the air nozzles 1510, blades 196 may be actuated or simply act as a passive means of guiding airflow and as a visual feature to hide the air nozzles 1510. Airflow may be supplied by using a pressurized cable running parallel to the cable holding the movable platform 100 and fed by an external compressor 1500 at a different location. In some embodiments actuation in the vertical direction is provided by a motorized cable winch 310 situated on the ceiling or at a nearby location and connected by a pulley system, as may be convenient.

FIG. 15B shows another embodiment 100, with blades 196 situated at its sides and bottom. Again, airflow is supplied externally via a pressurized air tube 150. In some embodiments, the movable platform 100 is actuated using a combination of ducted fans 190, propellers, air nozzles 1510, blades 196, flywheels 500, momentum wheels 1400, and gimbals 502.

FIG. 15C shows yet another embodiment with circular air outlets used rather than blades 196.

FIG. 15D shows a compressor 1500 used to provide pressurized air. In some embodiments, the compressor 1500 is positioned close to the movable platforms 100 to minimize pressure losses due to transporting pressurized air, yet such that its noise does not interfere with the movable platform's performance.

While rotational actuation, and actuation in yaw in particular, may be supplied by combinations of propellers, ducted fans 190, air nozzles 1510, or blades 196 for some of the embodiments mentioned above, it may be preferable to achieve rotational control using other means, such as a flywheel 500 mounted inside the movable platform 100. Depending on the application, multiple flywheels 500, gimbals 502, or momentum wheels 1400 may be used and combined to actuate multiple degrees of freedom.

While certain aspects of the present disclosure have been particularly shown and described with reference to exemplary embodiments thereof, it will be understood by those of ordinary skill in the art that various changes in form and details may be made therein without departing from the spirit and scope of the present disclosure. It is therefore desired that the present embodiments be considered in all respects as illustrative and not restrictive, reference being made to the appended claims rather than the foregoing description to indicate the scope of the claimed invention.

FIGURE REFERENCE NUMERAL LISTING

100 Movable platform
110 Payload
120 Structural element
122 Housing
124 Roll bar
126 Rotating joints
130 Movable platform's body coordinate frame
132 Center of mass
140 Support structure
150 Flexible support
150a Detached flexible support
152 First end of the flexible support, proximal attachment point
154 Second end of the flexible support, distal attachment point
156 First angle of attachment
158 Second angle of attachment
160 Sensor
170 Actuator
180 Control module
190 Ducted fan
192 Air intake
194 Direction of thrust
196 Controllable blades
198 Handedness of fan, propeller
300 Rail
310 Winch
312 Motor
314 Gears
316 Screw thread
318 Guide hole
320 Rotary actuator
322 Angular encoder
330 Rotary encoder
340 Cable carrier
350 Slider
370 Equilibrium point
500 Flywheel
502 Gimbal
790 Audience
810 Stage
820 Performer
830 Tracking system
840 Speaker
850 Media/motion coordination station
860 Media interface
862 Projection mapping system
880 Operator
890 Spotlight
920 Power interface
930 Signal interface
950 MCU
1000 Translational unit
1010 Winch control unit
1020 Linear actuator
1030 Linear encoder
1050 Slider control unit
1120 Power source
1200 Actuators unit
1202 Actuators
1210 Sensors unit
1220 Control unit
1230 Evaluation unit
1235 Interaction unit
1240 Payload unit
1245 Media/motion coordination unit
1250 Memory A
1252 Memory B
1260 Signal A
1262 Signal B
1264 Signal C
1266 Signal D
1268 Signal E
1270 Signal TIME
1272 Signal EXT
1274 External disturbances
1276 Forces produced by movable platform
1280 Start
1282 Step 1
1284 Step 2
1286 Step 3
1288 Step 4
1290 Step 5
1292 Step 6
1294 Step 7
1296 Step 8
1298 End
1300 Rear projector
1310 Counter rotating propellers
1330 E-Stop 1400 Momentum wheel
1500 Compressor
1510 Air nozzles

The invention claimed is:

1. A movable platform, comprising a structural element; a display structured and arranged to be coupled to the structural element;
a first flexible support having a first end and a second end, the first end structured and arranged to be coupled to the structural element at a proximal attachment point, and the second end structured and arranged to be coupled to a support structure at a distal attachment point, wherein the structural element is structured and arranged to hang from and receive at least some support from the first flexible support;
a sensor structured and arranged to provide data representative of movement of the display;
at least one actuator structured and arranged to be coupled to at least one of the structural element and the display, wherein the at least one actuator is structured and arranged to move the display based on at least one control signal; and
a control module structured and arranged to receive the data representative of the movement of the display and structured and arranged to send the at least one control signal to the at least one actuator, and operable to determine the at least one control signal based on the data representative of movement of the display and a reference signal.

2. The movable platform of claim 1, wherein the sensor is structured and arranged to be coupled to one of the structural element and the display.

3. The movable platform of claim 1, wherein the sensor comprises at least one of a camera, accelerometer, magnetometer, and gyroscope.

4. The movable platform of claim 1, wherein the first flexible support is structured and arranged to impose a constraint on the structural element and wherein the control module is further operable to determine the at least one control signal based on the constraint imposed by the first flexible support.

5. The movable platform of claim 1, wherein the control module is further operable to determine the at least one control signal based on data representative of display content for the display to coordinate the movement of the display with the display of the display content.

6. The movable platform of claim 1, wherein an angle is formed at the distal attachment point between the first flexible support and a vertical axis passing through the distal attachment point and wherein the at least one actuator is operable to cause the display to move such that the angle changes by at least 15 degrees when moving the display based on the at least one control signal.

7. The movable platform of claim 1, further comprising a second actuator structured and arranged to be coupled to the support structure, wherein the second actuator is structured and arranged to extend and retract the first flexible support from the distal attachment point based on a second control signal, wherein the distance between the distal attachment point and the proximal attachment point changes when the first flexible support is extended or retracted, and wherein the control module is structured and arranged to send the second control signal to the second actuator.

8. The movable platform of claim 1, further comprising a second actuator structured and arranged to be coupled to the support structure, wherein the second actuator is structured and arranged to move the location of the distal attachment point based on a second control signal, and wherein the control module is structured and arranged to send the second control signal to the second actuator.

9. The movable platform of claim 1, wherein the at least one actuator comprises at least two actuators, wherein the at least two actuators are structured and arranged to move the display based on at least two control signals, wherein the control module is structured and arranged to send the at least two control signals to the at least two actuators, and wherein the control module is operable to determine the at least two control signals based on the data representative of the movement of the display and a reference signal.

10. The movable platform of claim 1, wherein the at least one actuator is at least one of a ducted fan, propeller, air nozzle, fin, vane, flywheel, momentum wheel, and a mass shift mechanism.

11. The movable platform of claim 1, wherein the display is one of a projection display screen, LCD display screen, LED display screen, and plasma display screen.

12. The movable platform of claim 1, wherein the control module is operable to determine the at least one control signal to achieve a desired position and orientation of the display.

13. The movable platform of claim 1, wherein control module is operable to control at least two translational degrees of freedom and at least two rotational degrees of freedom of the display.

14. The movable platform of claim 1, further comprising a second flexible support, wherein the structural element is further structured and arranged to hang from and receive at least some support from the second flexible support.

15. The movable platform of claim 1, wherein the control module is operable to coordinate movement of multiple displays.

16. The movable platform of claim 1, wherein the at least one actuator is structured and arranged to provide a force to one of the structural element and display that is independent from the support received from the flexible support.

17. The movable platform of claim 1, wherein:
the first flexible support, without action by the at least one actuator, imposes an equilibrium position on the structural element and display; and
the at least one actuator is configured to move the structural element and display away from the equilibrium position based on the at least one control signal.

18. A method for operating a movable platform, the movable platform comprising:
an onboard portion;
an offboard portion;
a flexible support structured and arranged to couple the onboard portion to the offboard portion, wherein the onboard portion is structured and arranged to hang from and receive at least some support from the flexible support;
at least one actuator operable to move the onboard portion, wherein the at least one actuator is structured and arranged to provide a force on the onboard portion that is independent from the support received from the flexible support; and
at least one sensor operable to provide data representative of movement of the onboard portion of the movable platform,
the method comprising the steps of:
filtering the data representative of movement of the onboard portion of the movable platform; and controlling the at least one actuator based on the filtered data representative of movement of the onboard portion of the movable platform.

19. A method according to claim 18, wherein the filtering the data comprises computing an estimate of a state of at least the onboard portion of the movable platform with respect to a predefined reference frame.

20. A method according to claim 19, further comprising the steps of:
defining a target state for at least the onboard portion of the movable platform; and
using the target state for controlling the at least one actuator based on the estimate of the state,
wherein at least two of a position, an attitude, a velocity, and a rotational rate of at least the onboard portion of the movable platform are included in each of the estimate of the state and the target state.

21. A method according to claim 19, further comprising the steps of:
defining a target velocity of the onboard portion of the movable platform;
estimating the current velocity of the onboard portion of the movable platform;
comparing the target velocity and the current velocity;
computing signals based on the comparison of the target velocity and the current velocity;
using the computed signals for controlling the at least one actuator to move the onboard portion of the movable platform with respect to the predefined reference frame;
or comprising the steps of:
defining a target position of the onboard portion of the movable platform;
estimating the current position of the onboard portion of the movable platform;
comparing the target position and the current position;
computing signals based on the comparison of the target position and the current position; and
using the computed signals for controlling the at least one actuator to move the onboard portion of the movable platform with respect to the predefined reference frame.

22. The method of claim 18, wherein:
the flexible support, without action by the at least one actuator, imposes an equilibrium position on the onboard platform; and
the at least one actuator is operable to provide a force on the onboard platform to move it away from the equilibrium position based on the filtered data.

23. A control unit for a movable platform, the movable platform comprising:
a display;
a flexible support structured and arranged to be coupled to the display, wherein the display is structured and arranged to receive at least some support from the flexible support;
at least one actuator structured and arranged to move the display in space, wherein the at least one actuator is structured and arranged to provide a force on the display that is independent from the support received from the flexible support;
at least one sensor structured and arranged to provide data representative of the movement of the display in space; and
a control module structured and arranged to:
receive the data representative of the movement of the display in space;
determine one or more control signals for the at least one actuator based on the data representative of the movement of the display in space and a reference signal; and
provide the one or more control signals to the actuator.

24. The control unit of claim 23, wherein:
the flexible support, without action by the at least one actuator, imposes an equilibrium position on the display; and
the at least one actuator is operable to move the display away from the equilibrium position based on the one or more control signals.

* * * * *